(12) United States Patent
Jeong

(10) Patent No.: US 10,331,340 B2
(45) Date of Patent: Jun. 25, 2019

(54) DEVICE AND METHOD FOR RECEIVING CHARACTER INPUT THROUGH THE SAME

(71) Applicant: Samsung Electronics Co., Ltd., Suwon-si, Gyeonggi-do (KR)

(72) Inventor: Kyung-ho Jeong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 297 days.

(21) Appl. No.: 14/953,160

(22) Filed: Nov. 27, 2015

(65) Prior Publication Data

US 2016/0162183 A1 Jun. 9, 2016

(30) Foreign Application Priority Data

Dec. 4, 2014 (KR) ........................ 10-2014-0173237

(51) Int. Cl.
| | |
|---|---|
| *G06F 3/048* | (2013.01) |
| *G06F 3/0488* | (2013.01) |
| *G06F 3/041* | (2006.01) |
| *G06F 3/0482* | (2013.01) |
| *G06F 3/0484* | (2013.01) |
| *G06F 1/16* | (2006.01) |
| *G06F 3/01* | (2006.01) |
| *G06F 3/023* | (2006.01) |
| *G06F 3/0354* | (2013.01) |

(Continued)

(52) U.S. Cl.
CPC .......... *G06F 3/04886* (2013.01); *G06F 1/163* (2013.01); *G06F 3/011* (2013.01); *G06F 3/0236* (2013.01); *G06F 3/03547* (2013.01); *G06F 3/0412* (2013.01); *G06F 3/0416* (2013.01); *G06F 3/0482* (2013.01); *G06F 3/04842* (2013.01); *G06F 3/04883* (2013.01); *G04G 21/04* (2013.01); *G04G 21/08* (2013.01); *G06F 2203/0339* (2013.01); *G06F 2203/04803* (2013.01)

(58) Field of Classification Search
CPC ............................ G06F 3/04886; G06F 1/163
USPC ................................... 715/773, 771
See application file for complete search history.

(56) References Cited

U.S. PATENT DOCUMENTS

| | | | |
|---|---|---|---|
| 8,519,909 B2 | 8/2013 | Gomez et al. | |
| 2009/0249258 A1* | 10/2009 | Tang | .................... G06F 3/04883 715/863 |
| 2010/0328351 A1 | 12/2010 | Tan | |

(Continued)

FOREIGN PATENT DOCUMENTS

| | | |
|---|---|---|
| EP | 2320312 A1 | 5/2011 |
| EP | 2341420 A1 | 7/2011 |

(Continued)

*Primary Examiner* — Andrey Belousov
(74) *Attorney, Agent, or Firm* — Jefferson IP Law, LLP

(57) ABSTRACT

An electronic device and a method of receiving, by the electronic device, a character input from a user are provided. The electronic device includes a touch panel configured to receive a touch input generated by a pointing object and a swipe input of moving the pointing object while touching the touch panel with the pointing object, a processor configured to select one of a plurality of character sets based on a property of the touch input and select one of a plurality of characters included in the selected character set based on a property of the swipe input, and a display configured to display the selected character.

7 Claims, 24 Drawing Sheets

(51) Int. Cl.
*G04G 21/04* (2013.01)
*G04G 21/08* (2010.01)

(56) References Cited

U.S. PATENT DOCUMENTS

| | | |
|---|---|---|
| 2012/0299870 A1 | 11/2012 | Chi et al. |
| 2012/0306772 A1 | 12/2012 | Tan et al. |
| 2012/0317484 A1 | 12/2012 | Gomez et al. |
| 2013/0293494 A1 | 11/2013 | Reshef |
| 2014/0049477 A1* | 2/2014 | Dai .................... G06F 3/04886 |
| | | 345/173 |

FOREIGN PATENT DOCUMENTS

| | | |
|---|---|---|
| JP | 2005 0135101 A | 5/2005 |
| KR | 10-2012-0109464 A | 10/2012 |
| KR | 10-2014-0086473 A | 7/2014 |

\* cited by examiner

FIG. 7
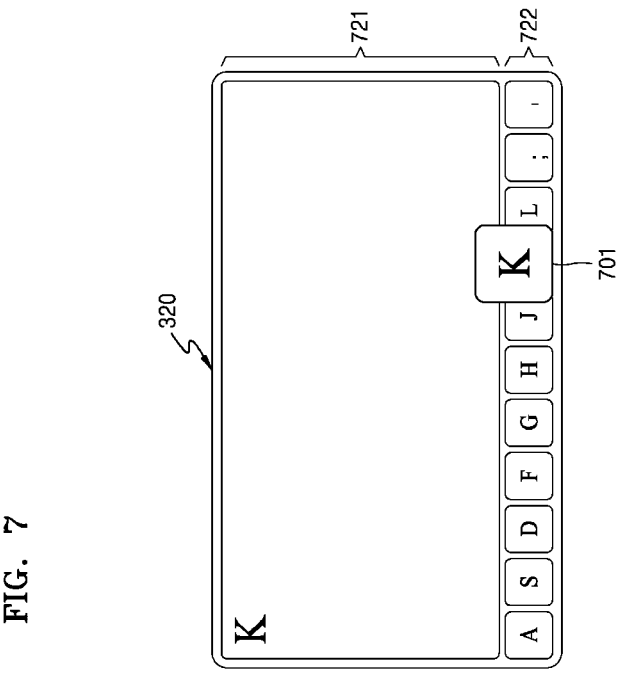
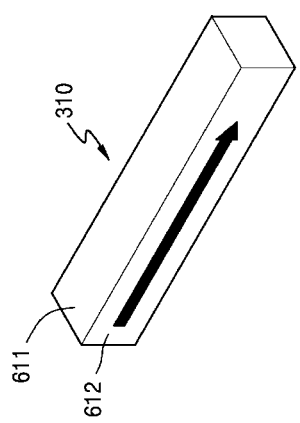

FIG. 8
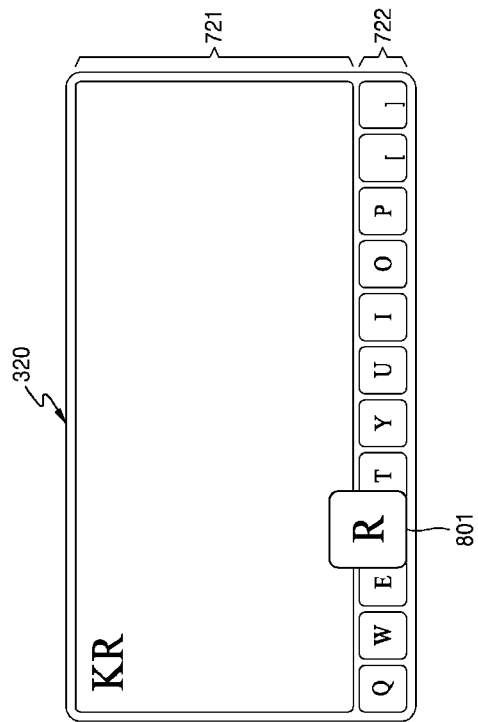
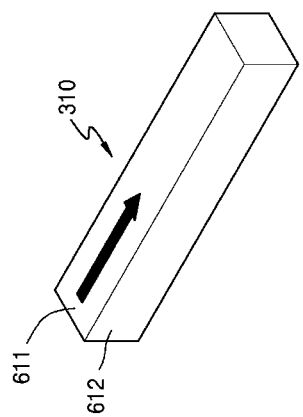

FIG. 9
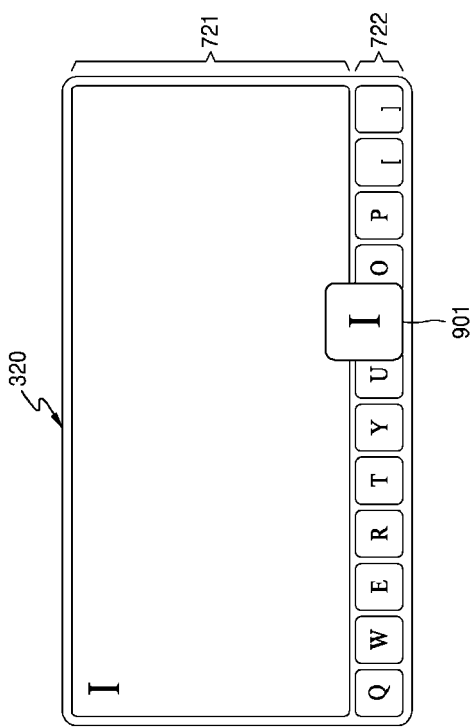
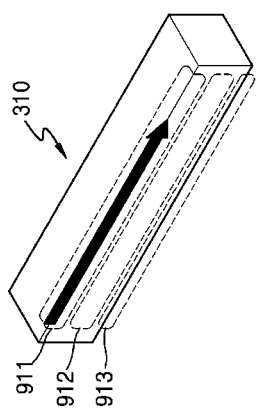

FIG. 10
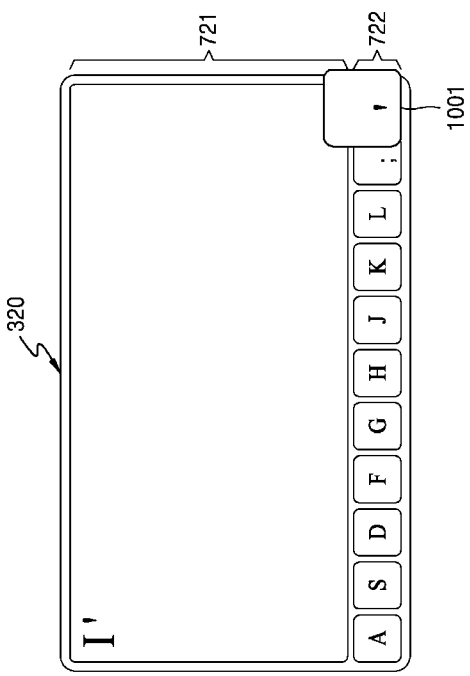
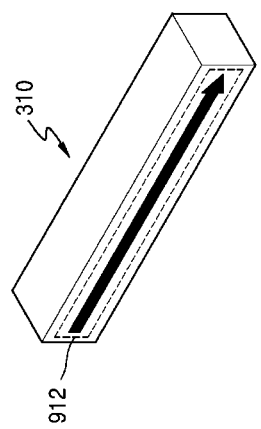

FIG. 11
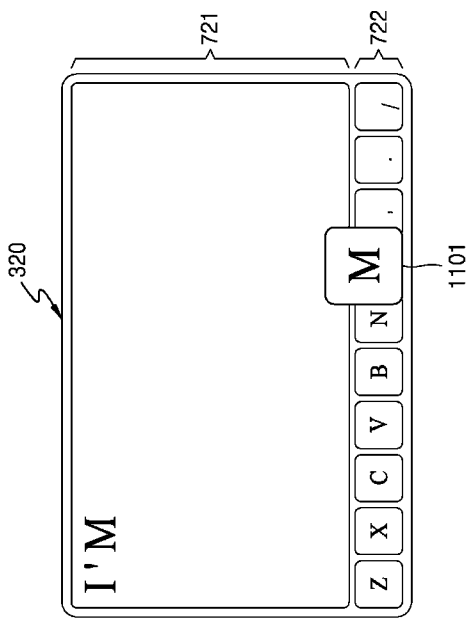
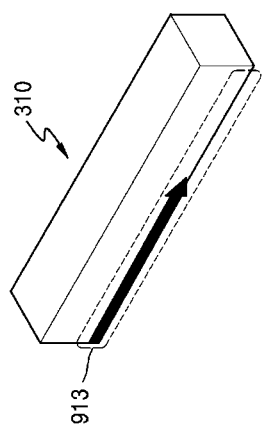

FIG. 21
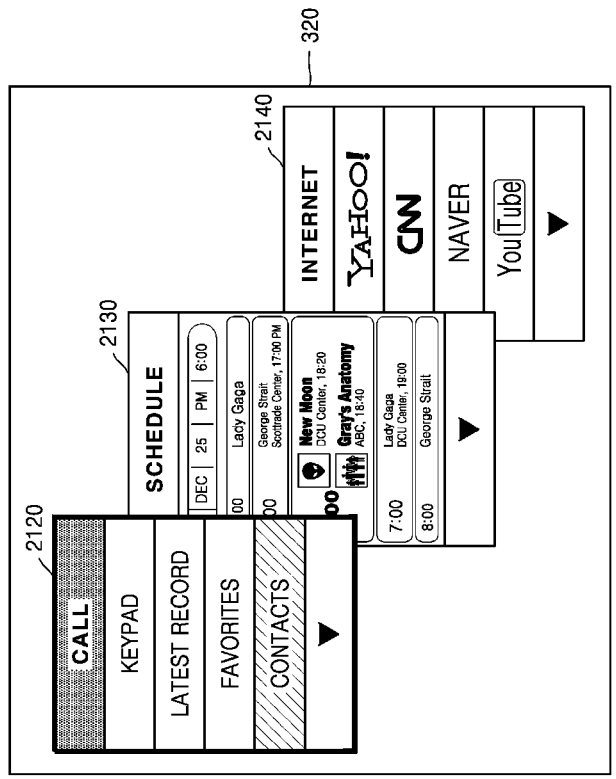
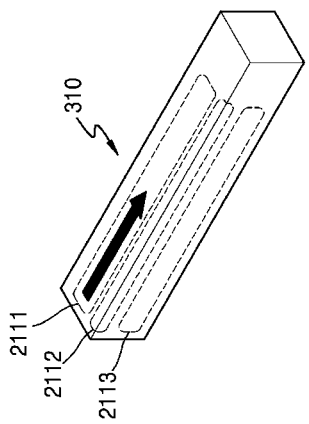

DEVICE AND METHOD FOR RECEIVING CHARACTER INPUT THROUGH THE SAME

CROSS-REFERENCE TO RELATED APPLICATION(S)

This application claims the benefit under 35 U.S.C. § 119(a) of a Korean patent application filed on Dec. 4, 2014 in the Korean Intellectual Property Office and assigned Serial number 10-2014-0173237, the entire disclosure of which is hereby incorporated by reference.

TECHNICAL FIELD

The present disclosure relates to an electronic device and a method of receiving, by the electronic device, a character input from a user. More particularly, the present disclosure relates to a method of implementing a character input based on a swipe input of a user that is received through a touch panel and an electronic device for performing the same.

BACKGROUND

Various electronic devices, such as smart phones, smart watches, smart glasses, tablet personal computers (PCs), and the like, have been developed. Each electronic device may include an input device for receiving user inputs to perform one or more operations, such as calculation, data processing, language information processing, and the like. For example, in order to receive a character input from the user, the electronic device may include a physical keyboard having multiple keys that respectively correspond to characters and are arranged at regular intervals.

Since attempts to make the electronic device small and portable have been made, the physical keyboard has been a major obstacle in reducing the size of the electronic device. Therefore, by providing a virtual keyboard on a touch screen instead of providing a physical keyboard, a method of receiving a character input through keys of the virtual keyboard displayed on the touch screen has been developed.

However, it is impossible to decrease a hand size of a user, and thus, the virtual keyboard displayed on the touch screen needs to have keys of a certain size. Thus, the need for a virtual keyboard may also be an obstruction in reducing the size of the electronic device. More particularly, in the case of a wearable device having a relatively small space assigned thereto for receiving a touch input from the user, it may not be easy to create, on a touch screen, a virtual keyboard usable by the user for inputting characters.

Accordingly, a method of receiving a character input in a small touch space and an electronic device for implementing the method have to be developed, and the method may help the user quickly and accurately input characters.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device for allowing a user to quickly and accurately input characters in a small touch space, and a method of receiving, by the electronic device, a character input from the user.

Additional aspects will be set forth in part in the description which follows and, in part, will be apparent from the description, or may be learned by practice of the presented embodiments.

In accordance with an aspect of the present disclosure, an electronic device is provided. The electronic device includes a touch panel configured to receive a touch input generated by a pointing object and a swipe input of moving the pointing object while touching the touch panel with the pointing object, a processor configured to select one of a plurality of character sets based on a property of the touch input and select one of a plurality of characters included in the selected character set based on a property of the swipe input, and a display configured to display the selected character.

The processor may select one of the plurality of character sets based on the property of the touch input and control the display to display at least one of characters included in the selected character set.

The property of the touch input may include at least one of a number of touch points forming the touch input and a location on the touch panel where the touch input is received.

The electronic device may further include a plurality of touch panels. The processor may select a character set corresponding to a touch panel receiving the touch input, from among the plurality of character sets corresponding to the plurality of touch panels.

The plurality of character sets may respectively correspond to rows of a computer keyboard in which a plurality of keys are arranged and may include a plurality of characters corresponding to a plurality of keys included in a corresponding row from among the rows.

The property of the swipe input may include at least one of a direction in which the pointing object is moved during the swipe input, a distance that the pointing object is moved, and a movement velocity of the pointing object.

The processor may select one of the plurality of characters based on a distance from a reference point on the touch panel to a start point of the touch input and a distance that the pointing object is moved during the swipe input.

While the pointing object is moved during the swipe input, the display may display the plurality of characters included in the selected character set such that a character included in the selected character set and corresponding to the distance that the pointing object is moved may be differentiated from other characters included in the selected character set. The processor may select one of the plurality of characters included in the selected character set based on the distance that the pointing object is moved.

In accordance with another aspect of the present disclosure, a method of receiving, by an electronic device, a character input from a user is provided The method includes receiving, through a touch panel included in the electronic device, a touch input generated by a pointing object and a swipe input of moving the pointing object while touching the touch panel with the pointing object, selecting one of a plurality of character sets based on a property of the touch input, selecting one of a plurality of characters included in the character set based on a property of the swipe input, and displaying the selected character.

The selecting of one of the plurality of character sets may include selecting one of the plurality of character sets based on the property of the touch input and displaying at least one of the plurality of characters included in the selected character set.

The property of the touch input may include at least one of a number of touch points forming the touch input and a location on the touch panel where the touch input is received.

The electronic device may include a plurality of touch panels, and the selecting of one of the plurality of character sets may include selecting a character set corresponding to a touch panel receiving the touch input, from among the plurality of character sets corresponding to the plurality of touch panels.

The plurality of character sets may respectively correspond to rows of a computer keyboard in which a plurality of keys are arranged and may respectively include a plurality of characters corresponding to a plurality of keys included in a corresponding row from among the rows.

The property of the swipe input may include at least one of a direction in which the pointing object is moved during the swipe input, a distance that the pointing object is moved, and a movement velocity of the pointing object.

The selecting of one of the plurality of characters may include selecting one of the plurality of characters based on a distance from a reference point on the touch panel to a start point of the touch input and a distance that the pointing object is moved during the swipe input.

The selecting of one of the plurality of characters may include while the pointing object is moved during the swipe input, displaying the plurality of characters such that a character included in the selected character set and corresponding to the distance that the pointing object is moved is differentiated from other characters included in the selected character set, and selecting one of the plurality of characters included in the selected character set based on the distance that the pointing object is moved.

In accordance with another aspect of the present disclosure, a non-transitory computer-readable recording medium having recorded thereon a computer program, which, when executed by an electronic device, performs a method of receiving a character input from a user is provided. The method includes receiving a touch input generated by a pointing object and a swipe input of moving the pointing object while touching the touch panel with the pointing object, selecting one of a plurality of character sets based on a property of the touch input, selecting one of a plurality of characters included in the selected character set based on a property of the swipe input, and displaying the selected character.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6 to 8 illustrate diagrams of a method of receiving, by an electronic device including multiple touch panels, a character input based on a swipe input of a user according to various embodiments of the present disclosure;

FIGS. 9 to 11 illustrate diagrams of a method of receiving, by an electronic device including multiple touch panels, a character input based on a swipe input of a user according to various embodiments of the present disclosure;

FIGS. 21 and 22 illustrate diagrams of a method of selecting, by an electronic device, a window based on a property of a touch input and of browsing the selected window based on a property of a swipe input according to an embodiment of the present disclosure;

Throughout the drawings, it should be noted that like reference numbers are used to depict the same or similar elements, features, and structures.

DETAILED DESCRIPTION

Figure 1:
FIGS. 1 and 2 illustrate diagrams for describing inconvenience of a user wearing a wearable device when the user inputs characters according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It will be further understood that the terms "comprises" and/or "comprising" used herein specify the presence of stated features or components, but do not preclude the presence or addition of one or more other features or components. In addition, the term "unit" indicates a software component or a hardware component, such as a field-programmable gate array (FPGA) or an application specific integrated circuit (ASIC), and performs certain functions. However, the meaning of the term "unit" is not limited thereto. A "unit" may be included in a storage medium capable of performing addressing or may execute one or more processors. Therefore, the "unit" includes components, such as software components, object-oriented software components, class components, and tasks components, processes, functions, procedures, sub-routines, segments of program codes, drivers, firmware, micro-codes, circuits, data, database, data structures, tables, arrays, and variables. The components and functions of the "unit" may be combined into the smaller number of components and "units" or may be divided into the larger number of components and "units".

Throughout the specification, the term "character input" may be a letter, a number, or a symbol that is input by a user.

Hereinafter, the present disclosure will be described by explaining embodiments of the present disclosure with reference to the attached drawings such that the present disclosure will be easily practiced by those of ordinary skill in the art to which the present disclosure pertains. For clarity, descriptions that are not related to the present disclosure will be omitted.

Figure 2:
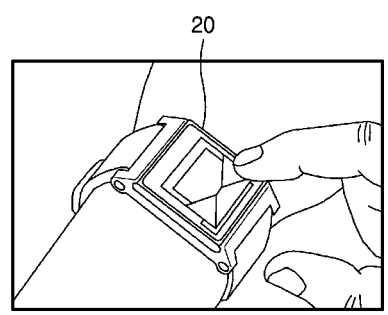

FIGS. 1 and 2 illustrate diagrams for describing inconvenience of a user wearing a wearable device when the user inputs characters according to various embodiments of the present disclosure.

Referring to FIGS. 1 and 2, a wearable device may be worn by a user. For example, as illustrated in FIG. 1, a wearable device 10 may be glasses which may arbitrarily rest on ears of the user by a frame, and the like. Alternatively, as illustrated in FIG. 2, a wearable device 20 may be a watch and may be arbitrarily worn on a wrist of the user.

The wearable device has a limited area where a touch input of a user is to be received. For example, the wearable device 10 of FIG. 1 may include touch panels on temples of the glasses that are respectively positioned on the left and right of the front of the glasses and rest on left and right ears. In addition, the wearable device 20 of FIG. 2 may include a touch panel on a bezel that fixes a display of the wearable device 20. Therefore, the wearable devices 10 and 20 may have a touch panel which is not large enough to display all keys of a virtual keyboard used to input characters. Accordingly, a method in which a user may quickly and accurately input characters through a wearable device, instead of through a virtual keyboard, is required.

The present disclosure provides a method of receiving, by an electronic device, such as a wearable device, a character input from the user through a small touch area, and the method helps the user quickly and accurately input characters.

Figure 3:
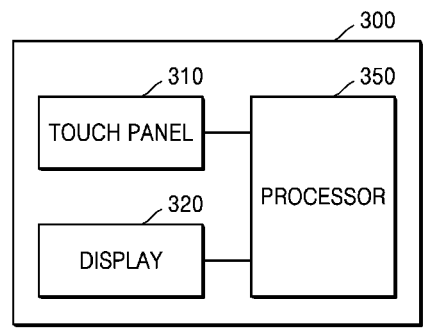
FIG. 3 illustrates a block diagram of an electronic device according to an embodiment of the present disclosure.

FIG. 3 illustrates a block diagram of an electronic device according to an embodiment of the present disclosure.

Referring to FIG. 3, an electronic device 300 may receive a character input from the user and may display the received character input or may output the received character input by processing the same.

The electronic device 300 according to an embodiment of the present disclosure may be the wearable device 10 of FIG. 1 or the wearable device 20 of FIG. 2, but is not limited thereto. The electronic device 300 may be a portable mobile device wearable by the user or a portable mobile device not worn by the user. For example, the electronic device 300 may be a smart watch, smart glasses, a mobile phone, a smart phone, a laptop computer, a tablet personal computer (PC), an e-book terminal, a digital broadcasting terminal, a personal digital assistant (PDA), a portable multimedia player (PMP), a navigation device, a moving picture experts group (MPEG-1 or MPEG-2) audio layer 3 (MP3) player, a digital camera, and the like.

Referring to FIG. 3, the electronic device 300 may include a touch panel 310, a display 320, and a processor 350.

The touch panel 310 may detect a gesture of touching the touch panel 310 by using a pointing object. In the specification, a pointing object may be a tool for actually or proximately contacting a touch panel. For example, the pointing object may be a stylus, a finger, and the like.

The touch panel 310 included in the electronic device 300 may detect a real-touch as well as a proximity touch of the user on the touch panel 310. In the specification, the "real touch" indicates that a pointing object directly contacts a touch panel, and the "proximity touch" indicates that the pointing object is within a certain distance from the touch panel without contacting the touch panel.

In the specification, the term "touch" may be understood as a real touch, but is not limited thereto. The term "touch" may be understood as both a real touch and a proximity touch.

The touch panel 310 may receive a touch input generated by the pointing object. The touch input may be a user's motion of touching the touch panel 310 by using the pointing object and then pausing at the touched location on the touch panel 310 for a certain amount of time. For example, the electronic device 300 may determine that a touch input is received when a touch input detected on the touch panel 310 remains at the touched location for tens to hundreds of milliseconds.

The processor 350 controls overall operations of the electronic device 300. For example, the processor 350 may select a character set from among multiple character sets based on a property of the touch input received through the touch panel 310. Each character set may include a plurality of characters. Characters respectively included in the multiple character sets may all be different. Each character included in the multiple character set may include letters of a language.

For example, the character sets used to input alphabets may respectively correspond to rows in which keys included in a computer keyboard (e.g., a QWERTY keyboard) are arranged. Each character set may include characters corresponding to keys included in a row corresponding to a character set from among rows of the computer keyboard.

A case where three character sets are used to input alphabets will be described below. A first character set among the three character sets may include characters corresponding to keys in an uppermost row of the qwerty keyboard, for example, Q, W, E, R, T, Y, U, I, O, and P. In addition, a second character set among the three character sets may include characters corresponding to keys in a second row of the qwerty keyboard, for example, A, S, D, F, G, H, J, K, and L. A third character set among the three character sets may include characters corresponding to keys in a lowermost row of the qwerty keyboard, for example, Z, X, C, V, B, N, and M. Alphabets may be input to the electronic device 300 by using a touch input and swipe input of the user with regard to the first, second, and third character sets.

Alternatively, each character set may include some characters corresponding to keys included in rows corresponding to respective character sets from among the rows of the computer keyboard. For example, the characters corresponding to the keys included in the uppermost row of the qwerty keyboard may be classified into two character sets. For example, Q, W, E, R, and T may be included in a character set, and Y, U, I, O, and P may be included in another character set.

Meanwhile, the property of the touch input that is a basis of selecting, by the electronic device 300, a character set may include at least one of the number of touch points forming a touch input and a location of the touch panel 310 where a touch input is received.

According to an embodiment of the present disclosure, the electronic device 300 may include a plurality of touch panels. The touch panels of the electronic device 300 may respectively correspond to the character sets. The processor 350 may select one of the character sets according to which of the touch panels receives a touch input from the user. The processor 350 may select a character set corresponding to the touch panel receiving the touch input, from among the character sets.

When the character set is selected, the processor 350 may control the display 320 in order to display at least one character included in the selected character set. For example, the processor 350 may display all characters included in a character set or a character having the highest priority among the characters included in the character set.

A priority order of the characters included in the character set may be determined in advance or determined based on a user input. For example, priorities may be assigned to the characters according to an order in which keys corresponding to the characters are arranged on a keyboard. Alternatively, priorities may be assigned to the characters according to an alphabetic order.

The touch panel 310 may receive a touch input and a swipe input of moving the pointing object while touching the touch panel 310 with the pointing object. The swipe input refers to a user's motion of touching the touch panel 310 by using the pointing object and simultaneously moving the pointing object by a certain distance. For example, the swipe input may be a motion of touching the touch panel 310 by using the pointing object and simultaneously moving the pointing object in a certain direction or a direction perpendicular to the certain direction. The electronic device 300 may identify an input of moving the pointing object in a direction different from the certain direction as an input that is not a swipe input.

The processor 350 may select one of characters included in the selected character set based on a property of the swipe input. The property of the swipe input may include at least one of a direction in which the pointing object is moved during the swipe input, a distance that the pointing object is moved, and a movement velocity of the pointing object.

The distance that the pointing object is moved may be a straight-line distance from a reference point on the touch panel 310 to an end point of the swipe input.

For example, the processor 350 may select one of the characters included in the character set based on a distance that the pointing object is moved during the swipe input. In this case, the processor 350 may select a character by further taking into account a distance from the reference point on the touch panel 310 to the touch input. A method of selecting, by the electronic device 300, a character by further taking into account the distance from the reference point on the touch panel 310 to the touch input will be described below with reference to FIGS. 17 and 18.

The display 320 may display and output information processed by the electronic device 300. The display 320 may display the character selected by the processor 350. In addition, the display 320 may further display a user interface (UI) for receiving a user input of controlling the electronic device 300 and a UI for setting a parameter related to a motion through which a user may enter a character.

The display 320 may be a touch screen formed in a layer structure with the touch panel 310. In this case, the touch screen may be used as an output device as well as an input device and be capable of performing all functions of the touch panel 310 and the display 320. The display 320 may include at least one of a liquid crystal display (LCD), a thin film transistor LCD (TFT LCD), an organic light-emitting diode (OLED) display, a flexible display, a three-dimensional (3D) display, and an electrophoretic display.

The display 320 according to an embodiment may display characters included in the character set selected by the processor 350 based on the touch input. The display 320 may display the characters included in the character set such that a character corresponding to the distance that the pointing object is moved during the swipe input is differentiated from other characters. For example, the character that corresponds to the distance that the pointing object is moved may be displayed differently from the other characters, and at least one of a color, shape, brightness, and size of the character may be different from at least one of colors, shapes, brightness, and sizes of the other characters.

Figure 4:
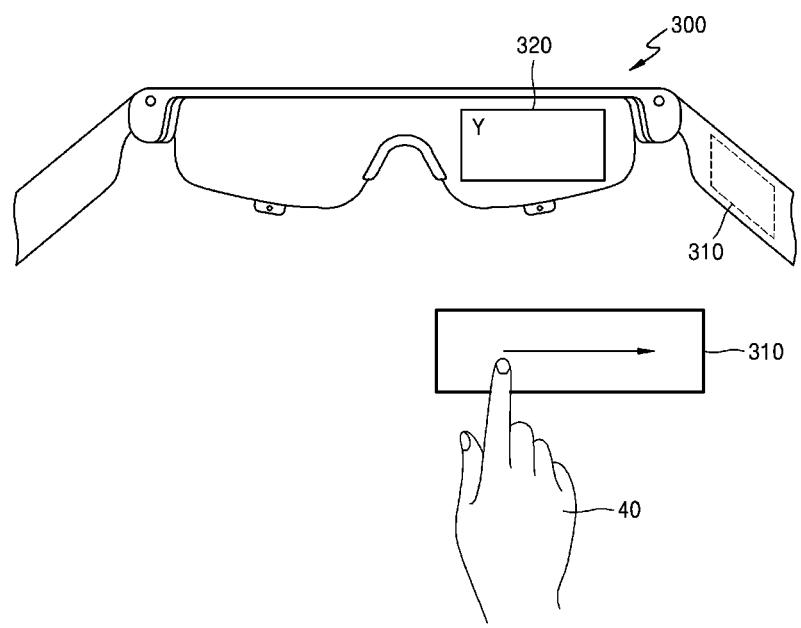
FIGS. 4 and 5 are diagrams illustrating methods of receiving, by an electronic device, a character input based on a swipe input of a user according to various embodiments of the present disclosure.
Figure 5:
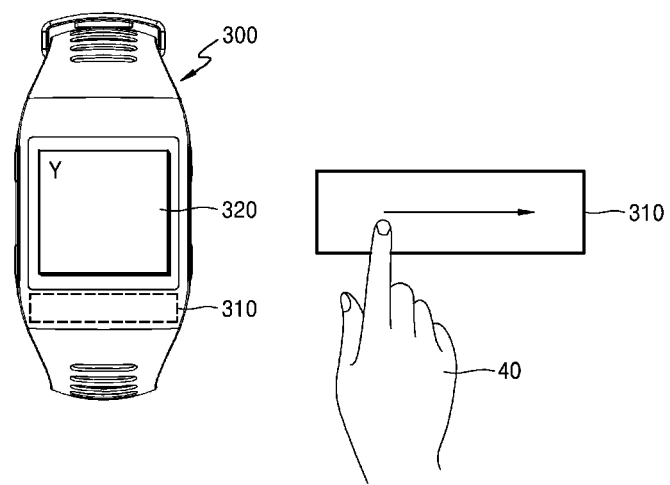

FIGS. 4 and 5 are diagrams illustrating methods of receiving, by an electronic device, a character input based on a swipe input of a user according to various embodiments of the present disclosure. FIGS. 4 and 5 illustrate that the electronic device 300 is a wearable device, but the present disclosure is not limited thereto.

Referring to FIG. 4, the electronic device 300 may be glasses resting on the head of the user 40. The electronic device 300 illustrated in FIG. 4, i.e., the glasses, may receive a touch input and a swipe input from the user 40 through the touch panel 310 positioned on the temples of the glasses. The electronic device 300 may select a character based on the touch input and the swipe input and may display the selected character on the display 320.

Therefore, the electronic device 300 may quickly receive a character input from the user 40 through a touch panel 310 which is not large enough to display a virtual keyboard for receiving the character input.

Referring to FIG. 5, the electronic device 300 may be a watch worn on a wrist of the user 40. The electronic device 300 illustrated in FIG. 5, i.e., the watch, may receive a touch input and a swipe input from the user 40 through the touch panel 310 positioned on a bezel of the electronic device 300. The electronic device 300 may select a character based on the touch input and the swipe input and may display the selected character on the display 320.

Therefore, the electronic device 300 may quickly receive a character input from the user 40 through the touch panel 310 which is not large enough to display a virtual keyboard for receiving a character input. Hereinafter, a method of receiving, by the electronic device 300, the character input from the user 40 will be described below with reference to FIGS. 6 to 8.

Figure 6:
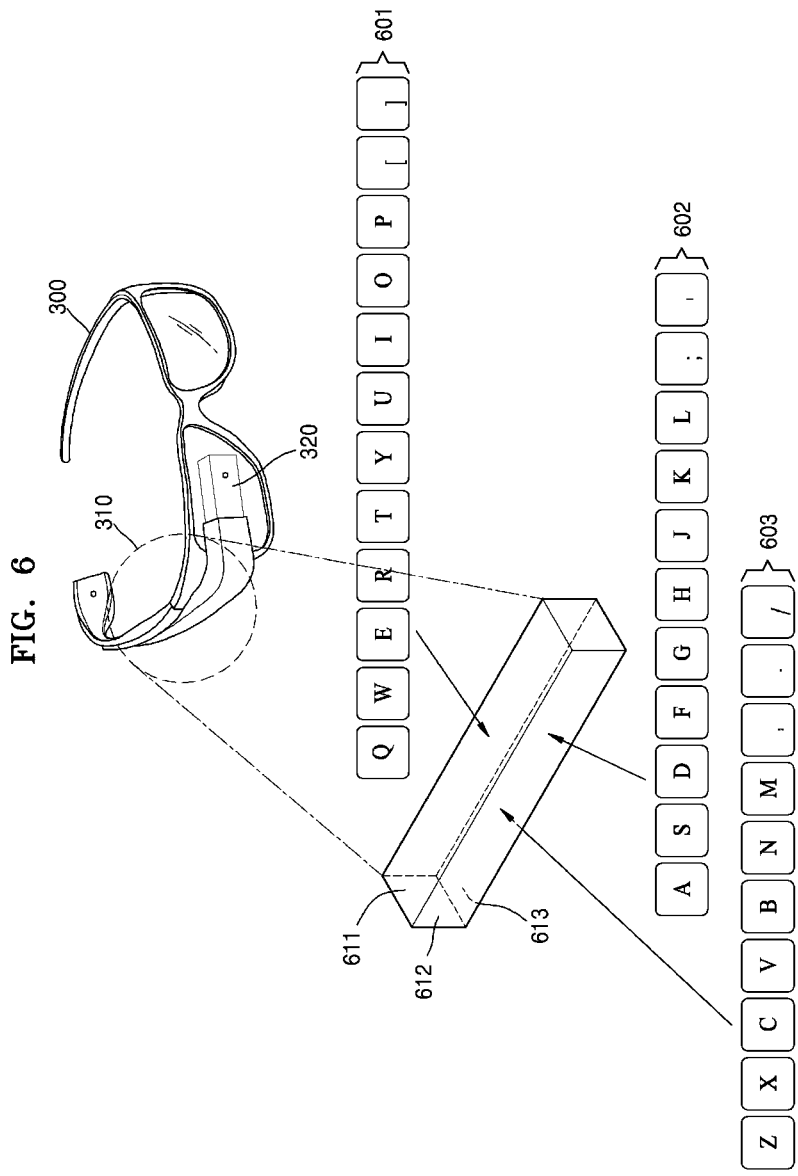

FIGS. 6 to 8 illustrate diagrams of a method of receiving, by an electronic device including multiple touch panels, a character input based on a swipe input of a user according to various embodiments of the present disclosure.

Referring to FIG. 6, the electronic device 300 may include multiple touch panels 611, 612, and 613. The touch panels 611, 612, and 613 included in the electronic device 300 may respectively correspond to character sets 601, 602, and 603 including characters.

For example, the touch panel 611 of the electronic device 300 may correspond to a first row of a qwerty keyboard. For example, the character set 601 including at least some of characters corresponding to keys included in the first row of the qwerty keyboard, that is, Q, W, E, R, T, Y, U, I, O, P, [,], may be mapped to the touch panel 611, and the mapping may be stored in a memory included in the electronic device 300.

The touch panel 612 of the electronic device 300 may correspond to a second row of the qwerty keyboard. For example, the character set 602 including at least some of characters corresponding to keys included in the second row of the qwerty keyboard, that is, A, S, D, F, G, H, J, K, L, ;, ', may be mapped to the touch panel 612, and the mapping may be stored in the memory included in the electronic device 300.

In addition, the touch panel 613 of the electronic device 300 may correspond to a third row of the qwerty keyboard. For example, the character set 603 including at least some of characters corresponding to keys included in the third row of the qwerty keyboard, that is Z, X, C, V, B, N, M, ,, ., /, may be mapped to the touch panel 613, and the mapping may be stored in the memory included in the electronic device 300.

The electronic device 300 may select one of the character sets 601, 602, and 603 based on which of the touch panels 611, 612, and 613 is touched by the user. For example, the electronic device 300 may select a character set 601 when the user touches the touch panel 611.

Referring to FIG. 7, the electronic device 300 may select a character set corresponding to the touch panel 612 from among character sets based on a touch input of the user touching the touch panel 612. For example, the selected character set may include the characters corresponding to the keys included in the second row of the qwerty keyboard.

The electronic device 300 may select one of the characters included in the selected character set based on a swipe input of touching the touch panel by using the pointing object and moving the pointing object on the touch panel.

The touch input and the swipe input of the user of FIG. 7 are illustrated as an arrow. Referring to FIG. 7, a location of the arrow indicates a location where the touch input is received on the touch panel 310, and a direction of the arrow indicates a direction in which the pointing object is moved during the swipe input. A length of the arrow indicates a distance that the pointing object is moved. The electronic device 300 may detect a movement of the pointing object illustrated as the arrow of FIG. 7 and may receive the touch input and the swipe input based on the movement of the pointing object.

The display 320 may display the characters included in the selected character set within an input area 722. The input area 722 may be used by the user to input the characters through the touch panel 310.

The display 320 may display the characters included in the character set such that a character corresponding to the distance that the pointing object is moved during the swipe input is differentiated from other characters. Therefore, the user may identify which character corresponds to the selected character through the input area 722 of the display 320, and if the selected character is not a desired character, the user may move the pointing object again to select the desired character.

The display 320 selects a character 701 based on a property of the swipe input, from among characters included in the selected character set, and may display the selected character 701 within an editing area 721. The editing area 721 may be used by the user to determine a character to be input or a character to be removed. For example, an electronic device 320 may select the character 701 from among the characters, based on the distance that the pointing object is moved.

Referring to FIG. 7, the electronic device 300 may select a character set including characters corresponding to keys included in the second row of the qwerty keyboard, based on the touch input of the user touching the touch panel 612 among the touch panels 611, 612, and 613. The electronic device 300 may display the characters included in the selected character set within the input area 722.

The electronic device 300 may display a character 701, that is, K, which corresponds to the distance from a start point of the touch input to a current location of the pointing object, differently from other characters, that is, A, S, D, F, G, H, I, J, L, ;, ", while the user moves the pointing object during a swipe input. In addition, the electronic device 300 may display the character 701, that is, K, corresponding to the distance to the current location of the pointing object within the editing area 721.

The electronic device 300 may make a final character selection based on a location of the pointing object at a point in time when the swipe input ends, that is, at a point in time when the touch panel 612 of the electronic device 300 detects that the pointing object stops moving.

Referring to FIG. 8, the electronic device 300 may select a character set corresponding to the touch panel 611 from among character sets based on the touch input of the user touching the touch panel 611. For example, the selected character set may include characters corresponding to the keys included in the first row of the qwerty keyboard.

Referring to FIG. 8, the electronic device 300 may select a character set including the characters corresponding to the keys included in the first row of the qwerty keyboard, based on the touch input of the user touching the touch panel 611 among the touch panels 611, 612, and 613. The electronic device 300 may display the characters included in the selected character set within an input area 722.

The electronic device 300 may display a character 801, that is, R, which corresponds to a distance from a start point of the touch input to a current location of the pointing object, differently from other characters, that is, Q, W, E, T, Y, U, I, O, P, [,], while the user moves the pointing object during a swipe input. In addition, the electronic device 300 may display the character 801, that is, R, corresponding to the distance to the current location of the pointing object, after the previously input character 701, that is, K. The electronic device 300 may make a final character selection based on a location of the pointing object at a point in time when the swipe input ends.

FIGS. 9 to 11 illustrate diagrams of a method of receiving, by an electronic device including multiple touch panels, a character input based on a swipe input of a user according to various embodiments of the present disclosure.

Referring to FIG. 9, at least some touch panels 911 and 913 among touch panels 911, 912, and 913 included in the electronic device 300 may be positioned along corners of the electronic device 300.

Each of the touch panels 911, 912, and 913 included in the electronic device 300 may correspond to a character set including characters. For example, the touch panel 911 of the electronic device 300 may correspond to a first row of the qwerty keyboard, the touch panel 912 may correspond to a second row of the qwerty keyboard, and the touch panel 913 may correspond to a third row of the qwerty keyboard.

Referring to FIG. 9, the electronic device 300 may select a character set corresponding to the touch panel 911 from among the character sets based on a touch input of the user touching the touch panel 911. For example, the selected character set may include characters corresponding to keys included in the first row of the qwerty keyboard.

Referring to FIG. 9, the electronic device 300 may select the character set including the characters corresponding to the keys included in the first row of the qwerty keyboard based on a touch input of the user touching the touch panel 911 among the touch panels 911, 912, and 913. The electronic device 300 may display the characters included in the selected character set within the input area 722.

The electronic device 300 may display a character 901, that is, I, which corresponds to a distance from a start point of the touch input to a current location of the pointing object, differently from other characters of the selected character set while the user moves the pointing object during a swipe input. The electronic device 300 may make a final character selection based on a location of the pointing object at a point in time when the swipe input ends.

Referring to FIG. 10, the electronic device 300 may select a character set corresponding to the touch panel 912 from among character sets based on a touch input of the user touching the touch panel 912. For example, the selected character set may include characters corresponding to keys included in the second row of the qwerty keyboard.

Referring to FIG. 10, the electronic device 300 may select the character set including the characters corresponding to keys included in the second row of the qwerty keyboard based on the touch input of the user touching the touch panel 912 among the touch panels 911, 912, and 913. The electronic device 300 may display the characters included, in the selected character set within the input area 722.

The electronic device 300 may display a character 1001, that is ', which corresponds to a distance from a start point of the touch input to a current location of the pointing object, differently from other characters of the selected character set while the user moves the pointing object during a swipe input, within the input area 722. In addition, the electronic device 300 may display the character 1001, that is, ', corresponding to a distance to the current location of the pointing object after the previously input character 901, that is, I. The electronic device 300 may make a final character selection based on a location of the pointing object at a point in time when the swipe input ends.

Referring to FIG. 11, the electronic device 300 may select a character set corresponding to the touch panel 913 from among character sets based on a touch input of the user touching the touch panel 913. For example, the selected character set may include characters corresponding to keys included in the third row of the qwerty keyboard.

Referring to FIG. 11, the electronic device 300 may select the character set including the characters corresponding to the keys included in the third row of the qwerty keyboard based on the touch input of the user touching the touch panel 913 among the touch panels 911, 912, and 913. The electronic device 300 may display the characters included in the selected character set within the input area 722.

The electronic device 300 may display a character 1101, that is, M, which corresponds to a distance from a start point of the touch input to a current location of the pointing object, differently from other characters of the selected character set while the user moves the pointing object during a swipe input. In addition, the electronic device 300 may display the character 1101, that is, M, corresponding to the distance to the current location of the pointing object, after the previously input character 1001, that is, '. The electronic device 300 may make a final character selection based on a location of the pointing object at a point in time when the swipe input ends.

FIGS. 6 to 11 illustrate that the touch panels of the electronic device 300 are flat, and corners of the electronic device 300 are located at boundaries where the touch panels are connected to one another. However, the present disclosure is not limited to the illustration of FIG. 6. The electronic device 300 according to an embodiment of the present disclosure may include a plurality of curved touch panels.

Alternatively, the electronic device 300 may include at least one touch panel, and the at least one touch panel includes detection areas. In this case, the detection areas may correspond to character sets. The electronic device 300 may select a character set based on a detection area receiving a touch input. The descriptions regarding FIGS. 6 to 11 may be applied to an embodiment of the present disclosure, that is, an embodiment in which a touch panel is divided into detection areas and touch inputs applied to respective detection areas are detected as individual touch inputs, and repeated descriptions will be omitted.

Hereinabove, the embodiment of selecting, by the electronic device 300, the character set based on a touch panel receiving a touch input and a swipe input of the user has been described with reference to FIGS. 6 to 11.

However, the present disclosure is not limited to the embodiment described with reference to FIGS. 6 to 11. A method of selecting one of character sets may be used based on a location of the touch input as well as properties of the touch inputs. For example, the present disclosure may include an embodiment of selecting, by the electronic device 300, one of character sets based on the number of touch points forming the touch input.

According to the above embodiment of the present disclosure, the electronic device 300 may detect a multi-touch. For example, the electronic device 300 may simultaneously detect one or more touch points. The electronic device 300 may store character sets respectively corresponding to the number of touch points forming the touch input and the number of the touch points.

For example, a touch input including one touch point may correspond to a first row of the qwerty keyboard. For example, when receiving the touch input including one touch point, the electronic device 300 may be configured to load a character set including at least some of characters, that is, Q, W, E, R, T, Y, U, I, O, P, [, and], corresponding to keys included in the first row of the qwerty keyboard.

A touch point including two touch points may correspond to a second row of the qwerty keyboard. For example, when receiving the touch input including two touch points, the electronic device 300 may be configured to load a character set including at least some of characters, that is, characters A, S, D, F, G, J, K, L, ;, ', corresponding to keys included in the second row of the qwerty keyboard.

In addition, a touch point including three touch points may correspond to a third row of the qwerty keyboard. For example, when receiving the touch input including three touch points, the electronic device 300 may be configured to load a character set including at least some of characters, that is, characters Z, X, C, V, B, N, M, ,, ., /, corresponding to keys included in the third row of the qwerty keyboard The electronic device 300 may select one of character sets based on the number of touch points forming the touch input.

Figure 12:
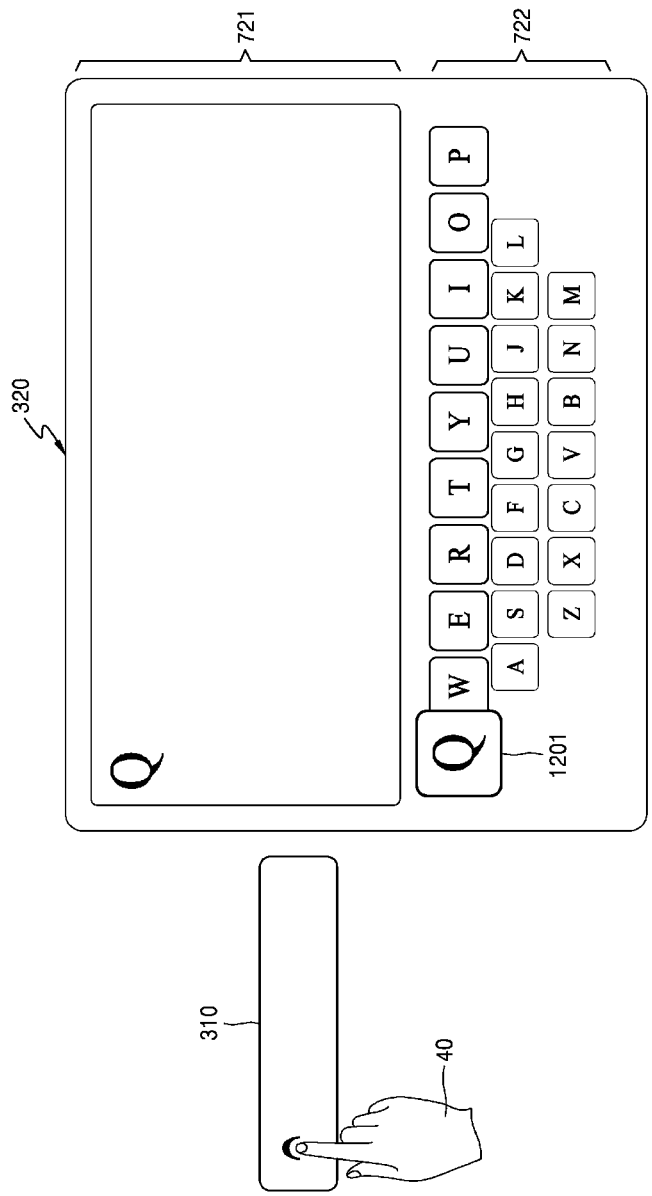
FIGS. 12 to 14 illustrate diagrams of a method of selecting, by an electronic device, a character set based on a property of a touch input and of selecting a character based on a property of a swipe input according to various embodiments of the present disclosure.
Figure 13:
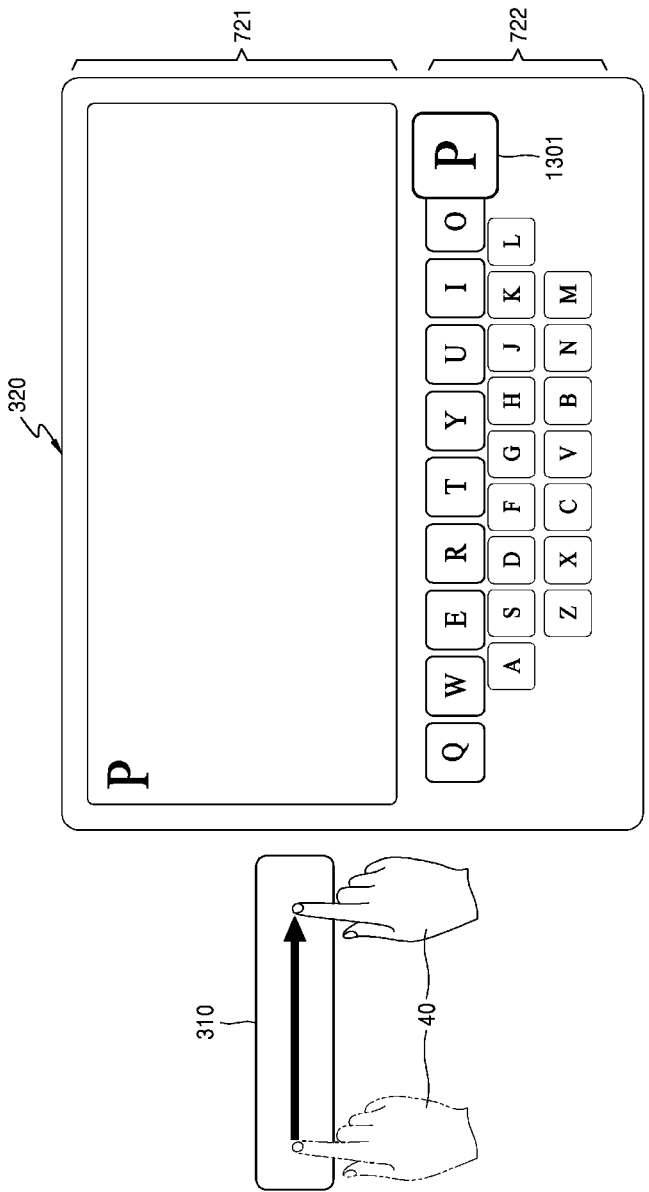
Figure 14:
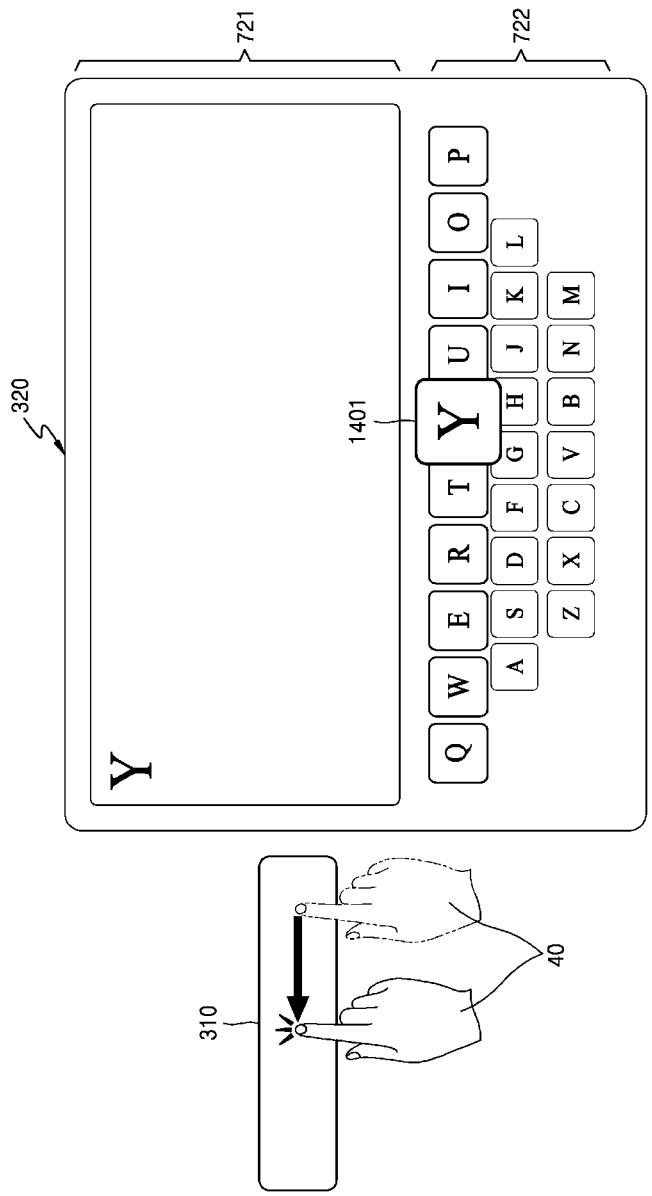

FIGS. 12 to 14 illustrate diagrams of a method of selecting, by an electronic device, a character set based on a property of a touch input and of selecting a character based on a property of a swipe input according to various embodiments of the present disclosure.

Referring to FIG. 12, the electronic device 300 may detect that a touch input includes one touch point. The electronic device 300 may select a character set that is stored corresponding to the touch input including one touch point, from among character sets, based on the fact that the number of touch points forming the touch input is one.

For example, the electronic device 300 may select a character set corresponding to a first row of the qwerty keyboard from among the character sets, based on the fact that the number of touch points forming the touch input is one. For example, the character set may include characters corresponding to keys included in the first row of the qwerty keyboard. The electronic device 300 may display at least some of the characters included in the selected character set, within the input area 722 of the display 320.

FIG. 12 illustrates that all characters included in the character sets for displaying English language are displayed in the input area 722, but the present disclosure is not limited thereto. The electronic device 300 may display characters included in the selected character set or may display characters having highest priorities among the characters included in the selected character set, in the input area 722. For example, the characters having the highest priorities among the characters included in the selected character set may correspond to the leftmost keys of the computer keyboard, and the keys may be included in the row corresponding to the selected character set.

Referring to FIG. 12, the electronic device 300 may display all characters included in the character sets in the input area 722. In this case, the electronic device 300 may display character sets such that a character set selected based on a property of the touch input is differentiated from other character sets. Therefore, the user may identify which character set is selected based on at least one of sizes, shapes, colors, and brightness of the character sets displayed in the input area 722. In addition, the electronic device 300 may display a character 1201, that is, Q, having the highest priority from among characters included in the selected character set, differently from other characters of the selected character set.

The electronic device 300 may receive a touch input and a swipe input of moving the pointing object 40 while touching the touch panel with the pointing object 40.

Referring to FIG. 13, the swipe input is illustrated as an arrow. Referring to FIG. 13, the electronic device 300 may display in the input area 722 a character 1301, that is, P, which corresponds to a distance from a start point of the touch input to a current location of the pointing object 40, differently from other characters of the selected character set while the user moves the pointing object 40 during the swipe input. In addition, the electronic device 300 may display in editing area 721 the character 1301, that is, P, corresponding to the distance to the current location of the pointing object 40.

The electronic device 300 may make a final character selection based on a location of the pointing object at a point in time when the swipe input ends. FIGS. 13 and 14 illustrate that the swipe input ends after the pointing object 40 is moved on the electronic device 300 in a certain direction (a rightward direction of FIG. 13) and then in a direction opposite the certain direction (a leftward direction of FIG. 14) while touching the electronic device 300 with the pointing object 40.

When the pointing object 40 touches the touch panel 310 and moves thereon and when a touch state is terminated (that is, when the pointing object 40 is spaced apart from the touch panel 310 by a certain distance), the electronic device 300 may determine that the swipe input is terminated.

Referring to FIG. 14, the electronic device 300 may select a character 1401, that is, Y, corresponding to a distance from a start point of the touch input to a location of the pointing object 40 at a point in time when the swipe input ends based on the location of the pointing object 40 at the point in time when the swipe input ends. The electronic device 300 may display the selected character 1401, that is, Y, in the editing area 721 and may wait to receive a new character input.

Figure 15:
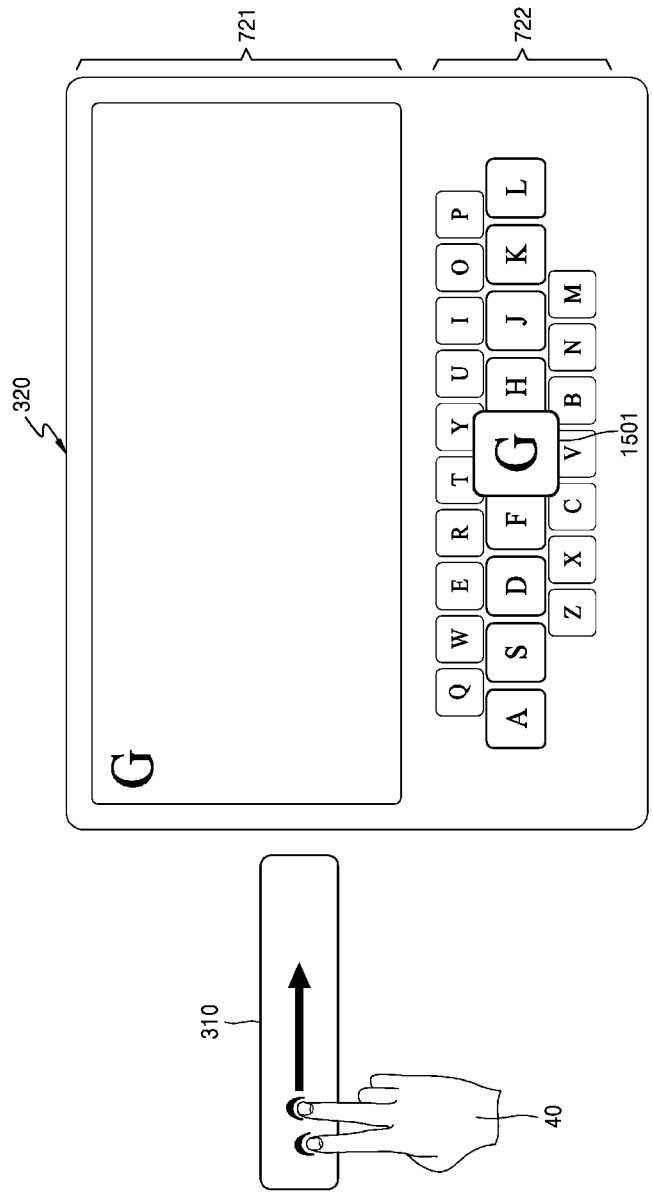
FIGS. 15 and 16 illustrate diagrams of a method of selecting, by an electronic device, a character set based on a number of touch points forming a touch input according to various embodiments of the present disclosure.
Figure 16:
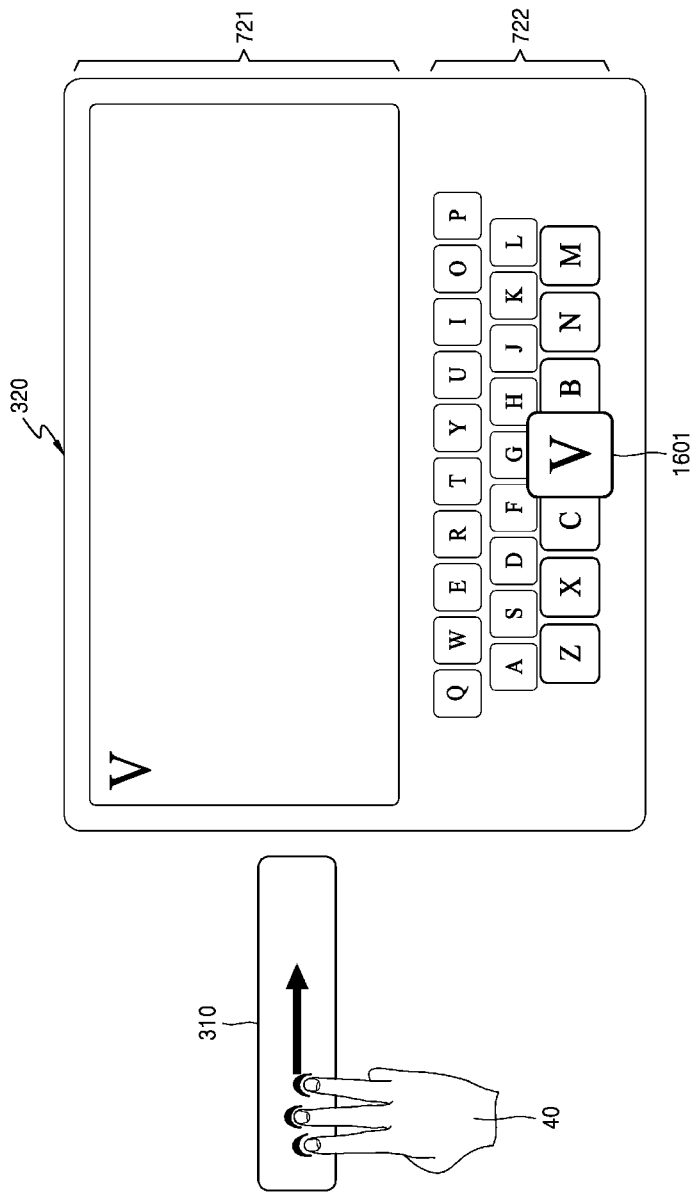

FIGS. 15 and 16 illustrate diagrams of a method of selecting, by an electronic device, a character set based on a number of touch points forming a touch input according to various embodiments of the present disclosure.

Referring to FIG. 15, the electronic device 300 may detect that a touch input includes two touch points, and the touch input is generated using the pointing object 40 by the user touching the touch panel 310. The electronic device 300 may select a character set that is stored corresponding to the touch input including two touch points, from among character sets, based on the touch input including two touch points.

For example, the electronic device 300 may select a character set corresponding to a second row of the qwerty keyboard from among character sets based on the touch input including two touch points. For example, the selected character set may include characters corresponding to keys included in the second row of the qwerty keyboard. The electronic device 300 may display at least some of the characters included in the selected character set within the input area 722 of the display 320.

The electronic device 300 may receive a touch input and a swipe input of moving the pointing object 40 while touching the touch panel 310 with the pointing object 40. Referring to FIG. 15, the electronic device 300 may select one of the characters included in the selected character set based on the distance that the pointing object 40 is moved during the swipe input.

For example, the electronic device 300 may display, in the input area 722, a character 1501, that is, G, which corresponds to a distance from a start point of the touch input to a current location of tire pointing object 40, differently from other characters of the selected character set while the user moves the pointing object 40 on the touch panel 310. In addition, the electronic device 300 may display the character 1501, that is, G, corresponding to the distance to the current location of the pointing object 40 in the editing area 721, in the editing area 721.

The electronic device 300 may make a final character selection based on a location of the pointing object 40 at a point in time when the swipe input ends.

In addition, referring to FIG. 16, the electronic device 300 may detect that a touch input using the pointing object 40 of the user touching the touch panel 310 includes three touch points. The electronic device 300 may select a character set that is stored corresponding to the touch input including three touch points, from among character sets, based on the touch input including three touch points.

For example, the electronic device 300 may select a character set corresponding to a third row of the qwerty keyboard from among character sets based on a touch input including three touch points. For example, the selected character set may include characters corresponding to keys included in the third row of the qwerty keyboard. The electronic device 300 may display at least some of the characters included in the selected character set within the input area 722 of the display 320.

The electronic device 300 may receive a touch input and a swipe input of moving the pointing object 40 while touching the touch panel 310 with the pointing object 40. Referring to FIG. 15, the electronic device 300 may select one of the characters included in the selected character set based on a distance that the pointing object 40 is moved during the swipe input.

For example, the electronic device 300 may display, within the input area 722, a character 1601, that is V, which corresponds to a distance from a start point of the touch input to a current location of the pointing object 40, differently from other characters of the selected character set while the pointing object 40 is moved on the touch panel 310. In addition, the electronic device 300 may display the character 1601, that is, V, corresponding to the distance to the current location of the pointing object 40, within the editing area 721.

The electronic device 300 may make a final character selection based on a location of the pointing object 40 at a point in time when the swipe input ends.

When the electronic device 300 selects a character by taking into account the distance that the pointing object 40 is moved during the swipe input, a distance from a reference point on the touch panel 310 to the touch input may be further taken into account.

Figure 17:
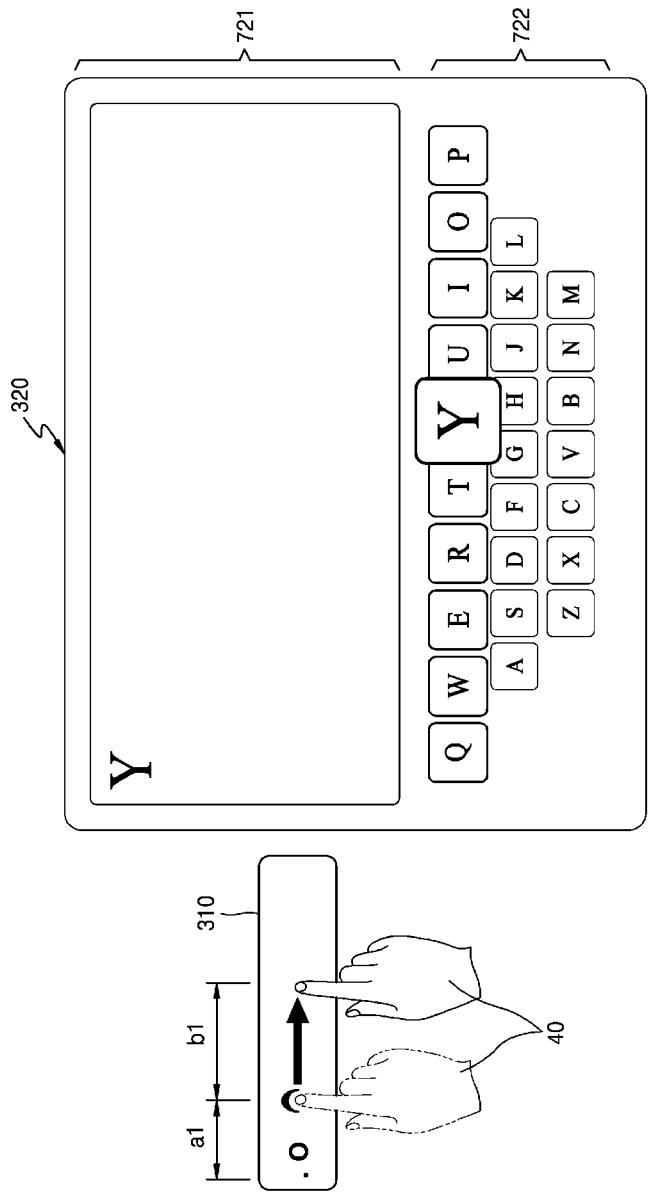
FIGS. 17 and 18 illustrate diagrams of a method of selecting, by an electronic device, characters based on a distance between a reference point of a touch panel and a touch input according to various embodiments of the present disclosure.
Figure 18:
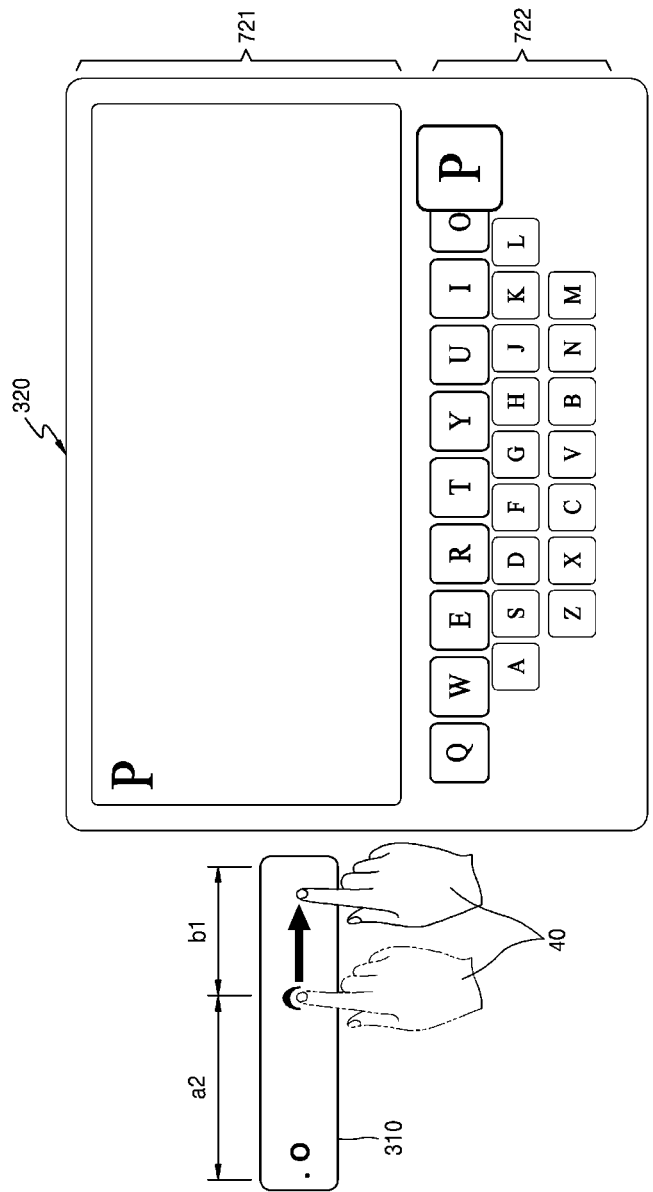

FIGS. 17 and 18 illustrate diagrams of a method of selecting, by an electronic device, characters based on a distance between a reference point of a touch panel and a touch input according to various embodiments of the present disclosure.

Referring to FIG. 17, the electronic device 300 may select a character corresponding to a distance b1 that the pointing object 40 moves to generate the swipe input. According to an embodiment of the present disclosure, priorities may be assigned to the characters included in the character set. For example, with regard to a character set including characters corresponding to keys included in a row of the qwerty keyboard, a character corresponding to a key arranged on a left side of the row of the qwerty keyboard may have a relatively higher priority than a character corresponding to a key arranged on a right side of the row.

The electronic device 300 may select a character having a low priority as the distance b1 that the pointing object 40 moves to generate the swipe input increases.

In this case, the electronic device 300 may select a character by further taking into account a distance a1 from a reference point O on the touch panel 310 to a start point of a touch input. The electronic device 300 may select a character having a low priority as the distance a1 from the reference point O on the touch panel 310 to the start point of a touch input increases.

A distance b1 that the pointing object 40 detected by the electronic device 300 in FIG. 18 moves is the same as the distance b1 that the detected pointing object 40 of FIG. 17 moves. However, a distance a2 of FIG. 18 from a reference point O on the touch panel 310 to the start point of the touch input is different from the distance a1 of FIG. 17 from the reference point O on the touch panel 310 to the start point of the touch input.

Referring to FIG. 18, the electronic device 300 may select a character, that is, P, having a lower priority than the character selected in FIG. 17, that is, Y, as the distance from the reference point O on the touch panel 310 to the start point of the touch input increases.

The electronic device 300 may edit a document, change a language to be input, store a document, or delete a document based on one or more touch gestures.

In addition, a method of receiving a user input based on the swipe input may be used to receive a command for controlling the electronic device 300 from the user, other than a character input.

The electronic device 300 provides the user with a menu including buttons corresponding to commands for controlling the electronic device 300. The electronic device 300 may perform a certain operation or change a function setting based on a user input of selecting at least one of the buttons.

The electronic device 300 may display a menu bar providing menus through the display 320. Each of the menus may include buttons corresponding to the commands for controlling the electronic device 300. The display 320 may display titles of summarizing properties of the commands corresponding to the buttons included in each menu.

Figure 19:
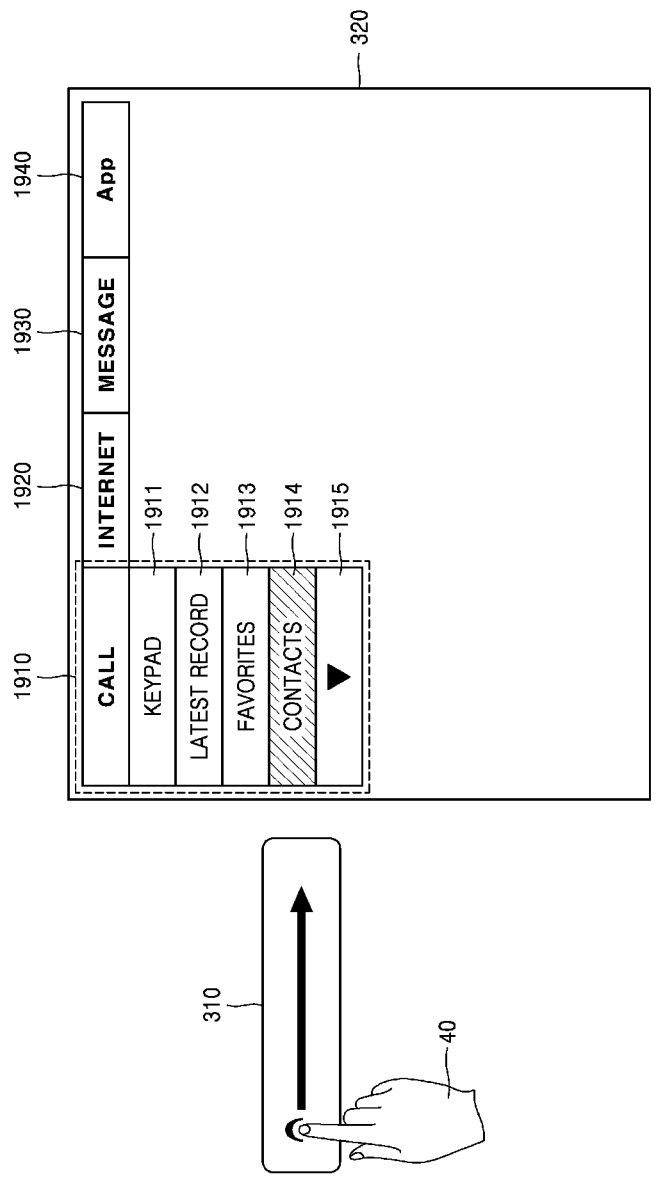
FIGS. 19 and 20 illustrate diagrams of a method of selecting, by an electronic device, a menu based on a property of a touch input and a button included in the selected menu based on a property of a swipe input according to various embodiments of the present disclosure.
Figure 20:
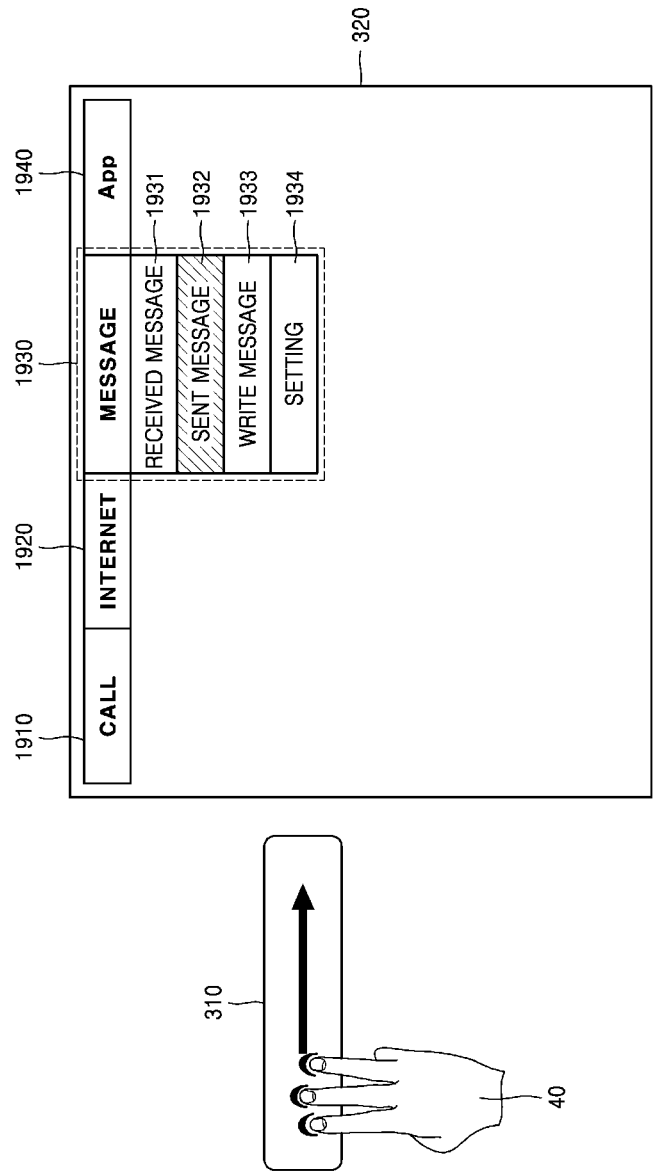

FIGS. 19 and 20 illustrate diagrams of a method of selecting, by an electronic device, a menu based on a property of a touch input and a button included in the selected menu based on a property of a swipe input according to various embodiments of the present disclosure.

Referring to FIG. 19, the electronic device 300 may provide menus 1910, 1920, 1930, and 1940 through the display 320. FIG. 19 illustrates that the electronic device 300 provides menus regarding "Call" 1910, "Internet" 1920, "Message" 1930, and "Application" 1940.

When receiving a user input of selecting at least one of the displayed menus 1910, 1920, 1930, and 1940, the electronic device 300 may activate the at least one selected menu. The activation of the menu may indicate that at least some of buttons included in the menus 1910, 1920, 1930, and 1940 are displayed.

Referring to FIG. 19, the electronic device 300 may select one of the menus 1910, 1920, 1930, and 1940 based on a property of a touch input of touching the touch panel 310. As described above, the electronic device 300 may select one of the menus 1910, 1920, 1930, and 1940 based on at least one of the number of touch points forming a touch input, a location where the touch input is received on a touch panel, and a touch panel among touch panels which receives a touch input.

FIGS. 19 and 20 illustrate that the electronic device 300 selects a menu based on the number of touch points forming the touch input.

Referring to FIG. 19, the electronic device 300 may detect that the touch input using the pointing object 40 of the user includes one touch point. The electronic device 300 may select a menu, which is stored corresponding to the touch input including one touch point, from among the menus 1910, 1920, 1930, and 1940, based on the fact that the number of touch points forming the touch input is one.

For example, the electronic device 300 may select the menu 1910 from among the menus 1910, 1920, 1930, and 1940, based on the fact that the number of touch points forming the touch input is one. The selected menu 1910 includes buttons corresponding to commands regarding a "call" function of the electronic device 300. The electronic device 300 activates and displays the selected menu 1910.

The electronic device 300 may receive a touch input and a swipe input of moving the pointing object 40 while touching the touch panel 310 with the pointing object 40. The electronic device 300 may select one of the buttons included in a menu 1910 selected based on a property of the swipe input. The electronic device 300 may be controlled based on a command corresponding to the selected button. For example, the electronic device 300 may select one of buttons 1911, 11912, 1913, 1914, and 1915 included in the selected menu 1910, based on the distance that the pointing object 40 is moved during the swipe input.

For example, the electronic device 300 may select the button 1914 based on the property of the swipe input and may display the selected button 1914 differently from the other buttons 1911, 1912, 1913, and 1915. The electronic device 300 may perform an operation corresponding to the button 1914 based on the swipe input of the user selecting the button 1914. For example, the electronic device 300 may provide the user with contacts stored in the electronic device 300, in response to the selection of the button 1914.

According to an embodiment of the present disclosure, the number of buttons that may be displayed on an activated menu window may be limited. If the number of buttons exceeds the number of buttons that is allowed to be displayed on the activated menu window, the button 1915 for selecting non-displayed buttons may be provided as illustrated in FIG. 19. When the user selects the button 1915, the non-displayed buttons included in the selected button 1915 may be displayed on the activated menu window, instead of the displayed buttons 1911, 1912, 1913, and 1914.

Referring to FIG. 20, the electronic device 300 may detect that the touch input using the pointing object 40 of the user includes three touch points. The electronic device 300 may select a menu, which is stored corresponding to the touch input including three touch points, from among menus 1910, 1920, 1930, and 1940, based on the fact that the number of touch points forming the touch input is three.

For example, the electronic device 300 may select the menu 1930 from the menus 1910, 1920, 1930, and 1940 based on the fact that the number of touch points forming the touch input is three. The selected menu 1930 includes buttons corresponding to commands regarding a "message" function of the electronic device 300. The electronic device 300 may activate and display the menu 1930 selected from among the menus 1910, 1920, 1930, and 1940.

The electronic device 300 may receive a touch input and a swipe input of moving the pointing object 40 while touching the touch panel 310 with the pointing object 40. The electronic device 300 may select one of buttons 1931, 1932, 1933, 1934 included in the menu 1930 selected based on a property of the swipe input. The electronic device 300 may be controlled based on a command corresponding to the selected button. For example, the electronic device 300 may select the button 1932 based on the property of the swipe input and may display the selected button 1932 differently from the other buttons 1931, 1933, and 1934. The electronic device 300 may perform an operation corresponding to the button 1932 based on the swipe input of the user selecting the button 1932. For example, the electronic device 300 may provide the user with received message that are stored in the electronic device 300, in response to the selection of the button 1932.

A method of receiving a user input based on the swipe input may be used to select one of displayed windows and search for the selected window. The window may refer to a designated portion of a display region of the display 320. The electronic device 300 may display, through the window, at least some of pieces of data (e.g., a menu for controlling the electronic device 300, information regarding applications executed by the electronic device 300, web-surf information received through a network from the electronic device 300, and the like).

The electronic device 300 may provide the user with windows for providing data to the user. The electronic device 300 may receive information through a selected window based on a user input of selecting at least one of the windows.

Figure 22:
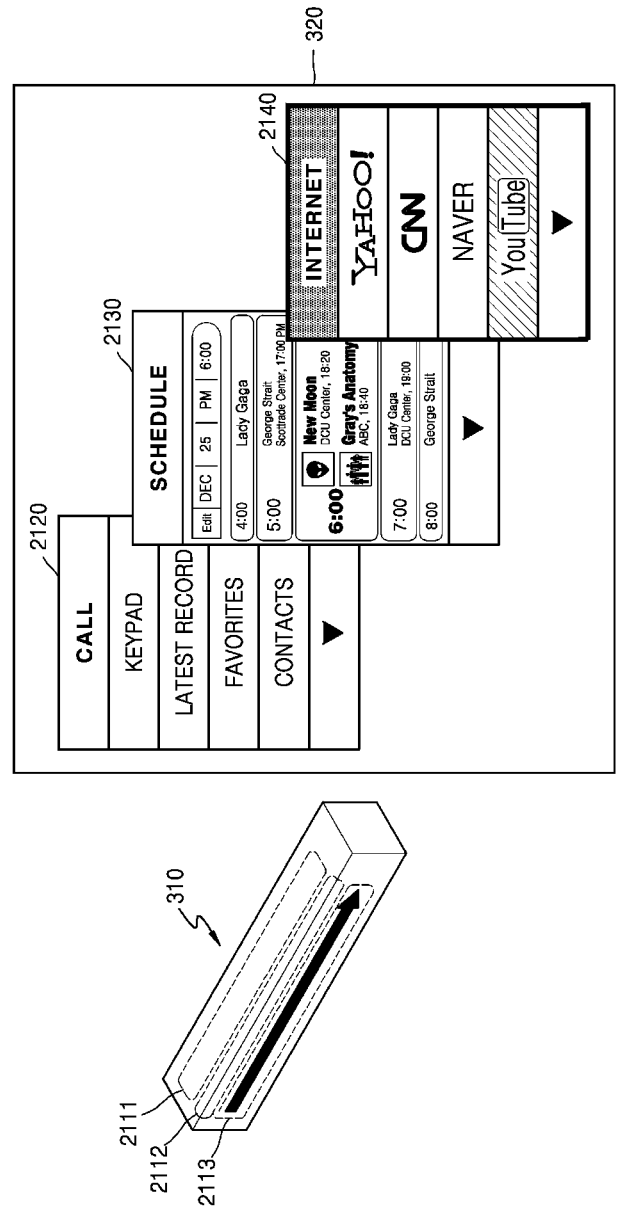

FIGS. 21 and 22 illustrate diagrams of a method of selecting, by an electronic device, a window based on a property of a touch input and of browsing the selected window based on a property of a swipe input according to an embodiment of the present disclosure.

Referring to FIG. 21, the electronic device 300 may provide windows 2120, 2130, and 2140 through the display 320. Referring to FIG. 21, the window 2120 for displaying a menu including buttons corresponding to commands of a call function of the electronic device 30, the window 2130 for displaying information provided by a schedule managing application, and the window 2140 for displaying buttons having a function of connecting the electronic device 300 to a website are displayed. However, the present disclosure is not limited to the windows 2120, 2130, and 2140 of FIG. 21, and the following windows may be further displayed: a web browsing window for providing information stored on the Internet in various forms, such as a text, a video, and a sound, a reproduction window for reproducing an audio, a video, and the like, and a exploring window for exploring files and folders stored in the electronic device 300.

When receiving a user input of selecting at least one of the displayed windows 2120, 2130, and 2140, the electronic device 300 may display the at least one selected window at the forefront.

The electronic device 300 may select one of the windows 2120, 2130, and 2140 based on a property of the touch input of touching the touch panel 310. As described above, the electronic device 300 may select one of the windows 2120, 2130, and 2140 based on at least one of the number of touch points forming the touch input, a location on the touch panel 310 where the touch input is received, and a touch panel among touch panels which receives the touch input.

FIGS. 21 and 22 illustrate that the electronic device 300 includes touch panels 2111, 2112, and 2113, and a window is selected based on which of the touch panels 2111, 2112, and 2113 receives the touch input.

Referring to FIG. 21, the electronic device 300 may detect that the touch input is received through the touch panel 2111 among the touch panels 2111, 2112, and 2113. The electronic device 300 may select a window corresponding to the touch panel 2111 from among the windows 2120, 2130, and 2140 based on the reception of the touch input through the touch panel 2111.

For example, the electronic device 300 may select the window 2120 among the touch panels 2111, 2112, and 2113 based on the reception of the touch input through the touch panel 2111. Referring to FIG. 21, the electronic device 300 may display the selected window 2120 in front of the other windows 2130 and 2140.

The electronic device 300 receives a touch input and a swipe input of moving the pointing object 40 while touching the touch panel 310 with the pointing object 40. The electronic device 300 may explore a window selected based on the property of the swipe input.

The exploring of a window may refer to selecting information provided through the window, selecting a button regarding a command for controlling the electronic device 300, or vertically or horizontally moving content through the window. For example, as illustrated in FIG. 21, the electronic device 300 may explore the window 2120 selected based on the property of the swipe input and may select at least one button provided through the window 2120.

Referring to FIG. 22, the electronic device 300 may detect that the touch input is received through the touch panel 2113 from among the touch panels 2111, 2112, and 2113. The electronic device 300 may select a window corresponding to the touch panel 2113 from among the windows 2120, 2130, and 2140 based on the reception of the touch input through the touch panel 2113.

For example, the electronic device 300 may select the window 2140 among the windows 2120, 2130, and 2140 based on the reception of the touch input through the touch panel 2113. Referring to FIG. 22, the electronic device 300 may display the selected window 2140 in front of the windows 2120 and 2130.

The electronic device 300 receive a touch input and a swipe input of moving the pointing object 40 while touching the touch panel 310 with the pointing object 40. The electronic device 300 may explore the selected window 2140 based on the property of the swipe input. For example, referring to FIG. 22, the electronic device 300 may explore the window 2140 selected based on the swipe input and, by selecting at least one of buttons provided through the window 2140, may access a website corresponding to the at least one selected button.

In addition, a method of controlling the electronic device 300 based on the touch input and the swipe input may be applied to various functions provided by the electronic device 300, for example, shooting and editing of an image, web-surfing, and the like. However, the present disclosure is not limited to the above method, and the electronic device 300 may be controlled based on various touch gestures, such as a touching & holding, double tapping, pinching, dragging & dropping, and the like.

The electronic device 300 may map properties of the touch gestures to operations of the electronic device 300 and may perform the operations based on the properties of the touch gestures. The properties of the touch gestures may include, for example, the number of touch points forming a touch gesture, a location where a touch gesture is received, whether a touch gesture is received through a touch panel or touch panels (i.e., whether a touch gesture is generated by moving the pointing object between the touch panels), and the like.

For example, the electronic device 300 may map the touch panels to operations for shooting and editing an image and may perform an operation corresponding to a touch panel based on a touch gesture for the touch panel.

The electronic device 300 may receive a swipe input from the user in order to set a parameter related to a shooting function, such as controlling a shooting speed based on a multi-touch on a touch panel (that is, a frame rate during shooting). In addition, the electronic device 300 may change a shooting mode of the electronic device 300 from a video shooting mode to a still image shooting mode or from the still image shooting mode to the video shooting mode based on a gesture of moving the pointing object between the touch panels while touching the touch panel 310 with the pointing object.

Figure 23:
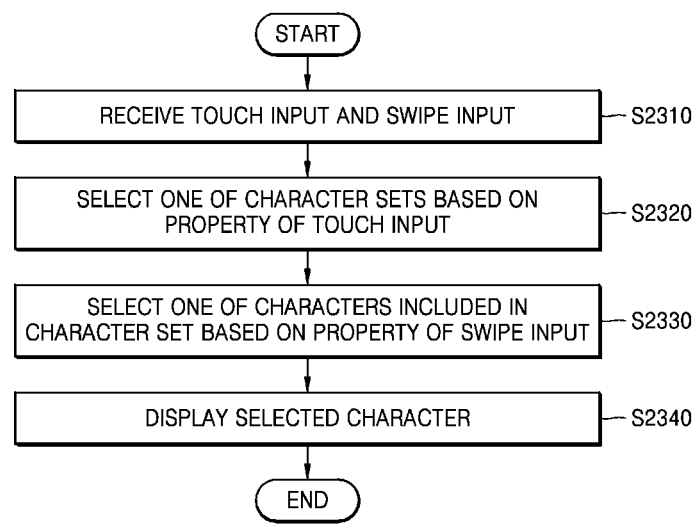
FIG. 23 illustrates a flowchart of a method of receiving, by an electronic device, a character input from a user according to an embodiment of the present disclosure.

FIG. 23 illustrates a flowchart of a method of receiving, by an electronic device, a character input from a user according to an embodiment of the present disclosure.

Referring to 23, each operation of FIG. 23 may be performed by components of the electronic device 300 of FIG. 3, and the descriptions provided with reference to FIG. 3 will be omitted.

In operation S2310, the electronic device 300 may receive a touch input and a swipe input from the user.

The electronic device 300 may receive a touch input using a pointing object through the touch panel 310 included in the electronic device 300. The electronic device 300 may receive the swipe input of moving the pointing object while touching the touch panel 310 with the pointing object.

In operation S2320, the electronic device 300 may select one of character sets based on a property of the touch input.

For example, the electronic device 300 may select one of character sets based on at least one of the number of touch points forming the touch input, a location on a touch panel where the touch input is received, and which of touch panels receives the touch input.

The electronic device 300 may select one of character sets based on the property of the touch input. The electronic device 300 may display at least one of characters included in the selected character set.

For example, the electronic device 300 may select a character set including characters corresponding to keys included in any one of rows of a qwerty keyboard, based on the property of the touch input. The electronic device 300 may display the characters included in the selected character set.

In operation S2330, the electronic device 300 may select one of the characters included in the character set based on a property of the swipe input.

For example, the electronic device 300 may select one of the characters included in the character set based on at least one of a direction in which the pointing object moves to generate the swipe input, a distance that the pointing object is moved, and a movement velocity of the pointing object.

The electronic device 300 may display a character, which corresponds to the distance that the pointing object is moved from among the characters, differently from other characters while the pointing object moves during the swipe input. The electronic device 300 may make a final character selection based on a location of the pointing object at a point in time when the swipe input ends. For example, the electronic device 300 may make a final character selection based on a distance from a start point of the touch input to a point where the pointing object stops moving.

In operation S2340, the electronic device 300 may display the selected character.

A method of receiving a character input is not limited to the method of FIG. 23, and the operations of FIG. 23 may be performed differently from the described order.

Figure 24:
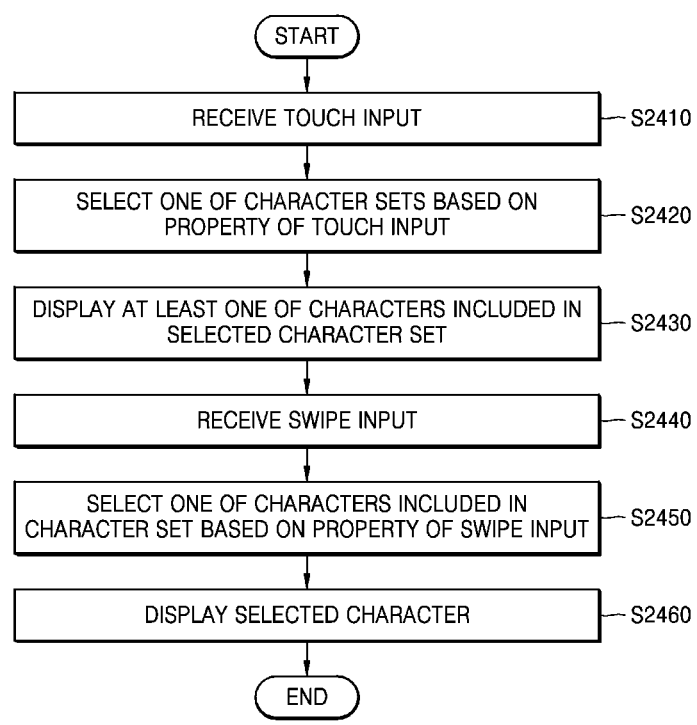
FIG. 24 illustrates a flowchart of a method of receiving, by an electronic device, a character input from a user according to another embodiment of the present disclosure.

The electronic device 300 may receive a character input according to a flowchart of FIG. 24.

FIG. 24 illustrates a flowchart of a method of receiving, by an electronic device, a character input from a user according to another embodiment of the present disclosure.

Referring to FIG. 24, in operation S2410, the electronic device 300 may receive a touch input from the user.

In operation S2420, the electronic device 300 may select one of character sets based on a property of the touch input.

In operation S2430, the electronic device 300 may display at least one of characters included in the selected character set.

In operation S2440, the electronic device 300 may receive a swipe input of moving the pointing object on the touch panel 310 while touching the touch panel 310 with the pointing object in operation S2410.

In operation S2450, the electronic device 300 may select one of the characters included in the character set based on a property of the swipe input.

In operation S2460, the electronic device 300 may display the selected character.

Figure 25:
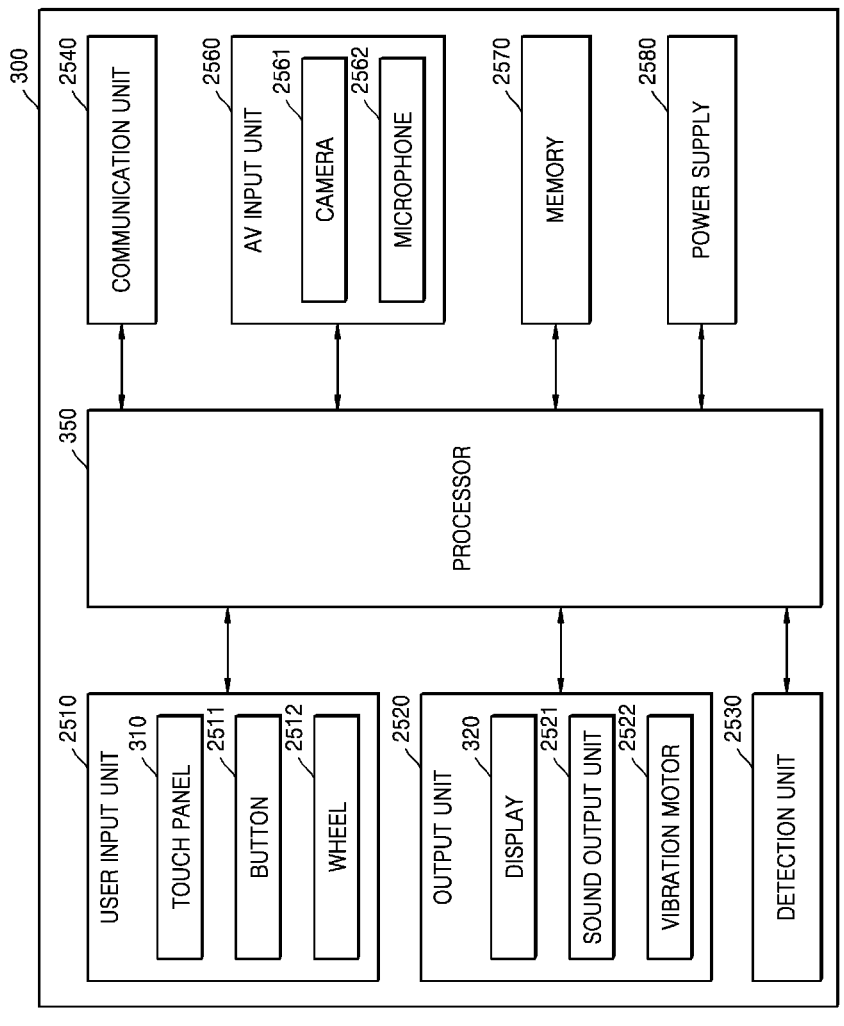
FIG. 25 illustrates a block diagram of an electronic device according to an embodiment of the present disclosure.

FIG. 25 illustrates a block diagram of an electronic device according to an embodiment of the present disclosure.

Referring to FIG. 25, the electronic device 300 may further include a user input unit 2510, an output unit 2520, a detection unit 2530, a communication unit 2540, an audio and video (AV) input unit 2560, a memory 2570, and a power supply 2580. These components may be connected to each other through a bus.

Hereinafter, the components will be sequentially described.

The user input unit 2510 receives a user input of controlling the electronic device 300. The user input unit 2510 includes the touch panel 310 for receiving a touch of the user and may further include at least one of a button 2511 for receiving push manipulation of the user, and a wheel 2512 for receiving rotation manipulation of the user. However, the user input unit 2510 according to an embodiment is not limited thereto and may further include a keyboard, a dome switch, and the like.

The output unit 2520 outputs information, which is received from the communication unit 2540, proceeded by the processor 350, or is stored in the memory 2570, in at least one form, such as light, sound, vibration, and the like. For example, the output unit 2520 includes the display 320 and may further include at least one of a sound output unit 2521 for outputting sounds and a vibration motor 2522 for outputting vibration. The sound output unit 2521 may output sounds (e.g., a call signal reception sound, a message reception sound, an alarm, and the like) regarding functions performed by the electronic device 300.

The detection unit 2530 detects a state of the electronic device 300 or a state around the electronic device 300 and may transmit detected information to the processor 350. For example, the detection unit 2530 may include a geomagnetic sensor, an acceleration sensor, a gyroscope sensor, a proximity sensor, an optical sensor, a depth sensor, an infrared sensor, an ultrasonic sensor, and the like.

The detection unit 2530 may detect at least one of an eye direction of a user and a head motion of the user.

For example, the electronic device 300 including a sensor for detecting the direction of the user's eyes may receive a character input by using a touch gesture of the user and information regarding the direction of the user's eyes. For example, the electronic device 300 may select a character set based on the touch input of the user touching the touch panel 310 and may load characters included in the selected character set on the display 320. When receiving the touch input, the electronic device 300 may activate a function for detecting the direction of the user's eyes. The electronic device 300 may select one of the loaded characters based on the direction of the user's eyes.

As another example, the electronic device 300 including a sensor for detecting the head motion of the user may receive a character input by using a touch gesture of the user and information regarding the head motion of the user. For example, the electronic device 300 may select a character set based on the touch input of the user touching the touch panel 310 and may load characters included in the selected character set on the display 320. When receiving the touch input, the electronic device 300 may activate a function for detecting the head motion of the user. The electronic device 300 may select one of the loaded characters based on the head motion of the user.

The communication unit 2540 is connected to a network in a wired or wireless manner and may communicate with an external device or server. The communication unit 2540 may transmit information displayed on the display 320, processed by the processor 350, or stored in the memory 2570 through the network. In addition, the communication unit 2540 may receive information displayed on the display 320, processed by the processor 350, or stored in the memory 2570 from the external device or server.

The communication unit 2540 may include one or more components that enable the communication with the external device or server. For example, the communication unit 2540 may include a short distance communication module, a wired communication module, a mobile communication module, a broadcasting reception module, and the like.

The AV input unit 2560 is configured to input an audio signal or a video signal and may include a camera 2561, a microphone 2562, and the like. The camera 2561 may acquire an image frame, such as a still image and a video, through an image sensor. An image captured by the image sensor may be processed by the processor 350 or a separate image processor.

An image frame processed by the camera 2561 may be stored in the memory 2570 or transmitted to an external device through the communication unit 2540. The electronic device 300 may include two or more cameras 2561 according to a structure of the electronic device 300.

The microphone 2562 receives an external sound signal and processes the received external sound signal as electrical sound data. For example, the microphone 2562 may receive a sound signal from an external device or a speaker. The microphone 2562 may use various noise removal algorithms for removing noise generated when the external sound signal is received.

The memory 2570 may store a program for processes or control of the processor 350 and may store data input to the electronic device 300 or output from the electronic device 300.

The memory 2570 may include at least one storage medium from among a flash memory-type storage medium, a hard disk-type storage medium, a multimedia card micro-type storage medium, card-type memories (e.g., a secure digital (SD) card, an extreme digital (XD) memory, and the like), a random access memory (RAM), a Static RAM (SRAM), a read-only memory (ROM), an Electrically Erasable Programmable Read-Only Memory (EEPROM), a Programmable ROM (PROM), a magnetic memory, a magnetic disc, an optical disc, and the like.

Programs stored in the memory 2570 may be classified into modules according to their functions. For example, the programs stored in the memory 2570 may be classified into a UI module for providing a UI, graphic UI (GUI), and the like, a touch screen module for detecting a touch gesture through the touch panel 310 and transmitting to the processor 350 information regarding the touch gesture, an alarm module for generating a signal of informing the occurrence of events in the electronic device 300, and the like.

The power supply 2580 supplies power necessary to operate the electronic device 300 to each component of the electronic device 300. The power supply 2580 may include a battery for charging power and may further include a cable or a cable port for receiving power from an external device.

Figure 26:
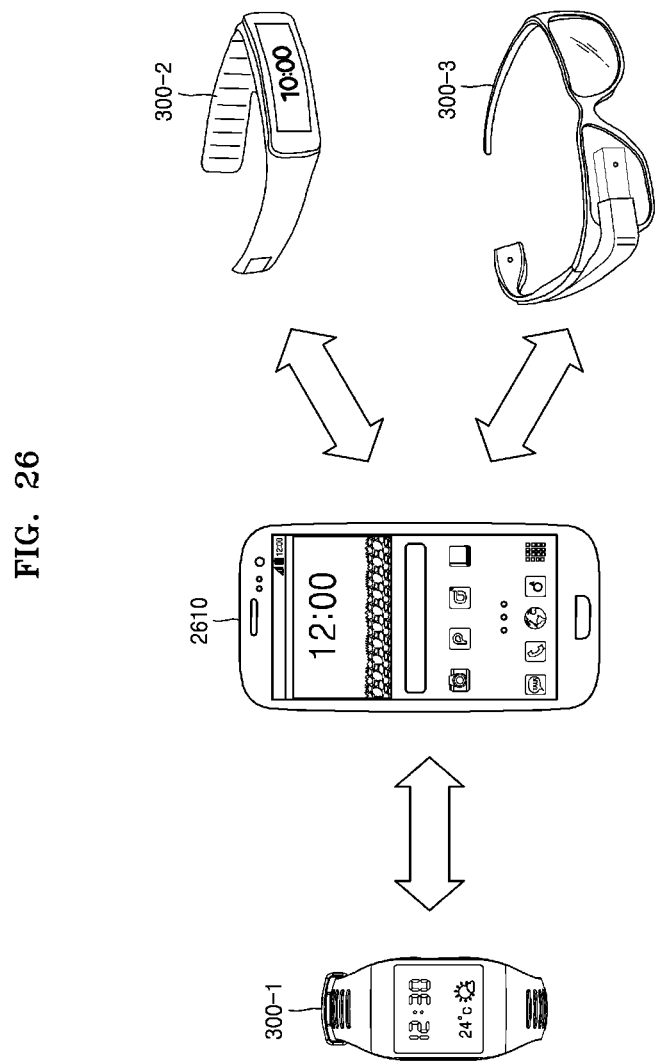
FIG. 26 illustrates a diagram of a system including an electronic device and a mobile phone operating in connection with the electronic device according to an embodiment of the present disclosure.

FIG. 26 illustrates a diagram of a system including the electronic devices 300-1, 300-2, and/or 300-3 operating in connection with a mobile phone 2610 according to an embodiment of the present disclosure.

The electronic devices 300-1, 300-2, and/or 300-3 may independently operate or may operate in connection with an external device, such as the mobile phone 2610, as illustrated in FIG. 26.

Referring to FIG. 26, the electronic devices 300-1, 300-2, and/or 300-3 transmits information received from the user to the mobile phone 2610 through the touch panel 310 and may receive information processed by the mobile phone 2610. For example, a character input received from the user through the touch panel 310 of the electronic devices 300-1, 300-2, and/or 300-3 may be transmitted to the mobile phone 2610 in a wired or wireless manner.

Referring to FIG. 26, the electronic device 300 includes a smart watch 300-1, a smart band 300-2, and smart glasses 300-3, but the present disclosure is not limited thereto. The electronic device 300 may be a mobile device having various shapes.

FIG. 26 illustrates that the electronic devices 300-1, 300-2, and/or 300-3 operates in connection with the mobile phone 2610, but the electronic device 300 according to an embodiment of the present disclosure is not limited thereto. For example, the electronic device 300 may operate in connection with a smart phone, a tablet PC, a PC, a smart television (TV), a mobile phone, a PDA, a laptop, a media player, a micro server, a global positioning system (GPS), an e-book terminal, a digital broadcasting terminal, a navigation device, a kiosk, an MP3 player, a digital camera, other mobile or non-mobile computer devices, and the like.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

It should be understood that various embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A wearable electronic device comprising:
a display;
a sensor;
a touch inputter; and
a processor configured to:
based on a touch input of a user wearing the wearable electronic device to the touch inputter, identify a number of touch points corresponding to the touch input,
select a character set corresponding to the number of touch points among one or more character sets and display the selected character set on the display,
based on the selection of the character set corresponding to the number of touch points, activate the sensor for detecting a head motion of the user,
based on the head motion of the user detected by the activated sensor, display one or more characters comprised in the selected character set on the display,
select a character corresponding to the direction of the head motion of the user among the one or more characters comprised in the selected character set, and
display the selected character on the display differently from other characters comprised in the selected character set.

2. The wearable electronic device of claim 1, further comprising a plurality of touch inputters, wherein the processor is further configured to select a character set corresponding to a touch inputter receiving the touch input, from among the plurality of character sets corresponding to the plurality of touch inputters.

3. The wearable electronic device of claim 1, wherein the plurality of character sets respectively correspond to rows of a computer keyboard in which a plurality of keys are arranged and comprise a plurality of characters corresponding to a plurality of keys included in a corresponding row from among the rows.

4. A method of receiving, by a wearable electronic device, a character input from a user, the method comprising:
- based on a touch input of a user earing the wearable electronic device to the touch inputter, identifying a number of touch points corresponding to the touch input,
- selecting a character set corresponding to the number of touch points among one or more character sets and display the selected character set on the display;
- based on the selection of the character set corresponding to the number of touch points, activating the sensor for detecting a head motion of the user;
- based on the head motion of the user detected by the activated sensor, displaying one or more characters comprised in the selected character set on the display;
- selecting a character corresponding to the direction of the head motion of the user among the one or more characters comprised in the selected character set; and
- displaying the selected character on the display differently from other characters comprised in the selected character set.

5. The method of claim 4,
wherein the wearable electronic device comprises a plurality of touch panels inputters, and
wherein the selecting of the character set corresponding to the number of touch points comprises selecting the character set corresponding to the touch inputter receiving the touch input, from among the plurality of character sets corresponding to the plurality of touch inputters.

6. The method of claim 4, wherein the plurality of character sets respectively correspond to rows of a computer keyboard in which a plurality of keys are arranged and respectively comprise a plurality of characters corresponding to a plurality of keys included in a corresponding row from among the rows.

7. At least one non-transitory computer-readable recording medium for storing a computer program configured to be readable by at least one processor for instructing the at least one processor to execute a computer process for performing the method of claim 4.

* * * * *